US010062201B2

(12) United States Patent
Nowozin et al.

(10) Patent No.: US 10,062,201 B2
(45) Date of Patent: Aug. 28, 2018

(54) TIME-OF-FLIGHT SIMULATION OF MULTIPATH LIGHT PHENOMENA

(71) Applicant: Microsoft Technology Licensing, LLC, Redmond, WA (US)

(72) Inventors: Sebastian Nowozin, Cambridge (GB); Amit Adam, Haifa (IL); Christoph Dann, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 221 days.

(21) Appl. No.: 14/692,527

(22) Filed: Apr. 21, 2015

(65) Prior Publication Data

US 2016/0314613 A1    Oct. 27, 2016

(51) Int. Cl.
*G06T 15/50* (2011.01)
*G06T 15/00* (2011.01)
(Continued)

(52) U.S. Cl.
CPC .......... *G06T 15/506* (2013.01); *G01S 7/4868* (2013.01); *G01S 7/497* (2013.01);
(Continued)

(58) Field of Classification Search
None
See application file for complete search history.

(56) References Cited

U.S. PATENT DOCUMENTS 8,294,809 B2   10/2012   Stettner
8,405,680 B1   3/2013    Cardoso Lopes et al.
(Continued)

FOREIGN PATENT DOCUMENTS

JP   2013-117958    6/2013
WO   WO 2008/152647  12/2008
WO   WO 2013/120041  8/2013

OTHER PUBLICATIONS

Adam et al., "Bayesian Time-of-Flight for Realtime Shape, Illumination and Albedo," *IEEE Trans. on Pattern Analysis and Machine Intelligence*, 23 pp. (Jul. 2015).
(Continued)

*Primary Examiner* — Said Broome
(74) *Attorney, Agent, or Firm* — Klarquist Sparkman, LLP

(57) ABSTRACT

Examples of time-of-flight ("TOF") simulation of multipath light phenomena are described. For example, in addition to recording light intensity for a pixel during rendering, a graphics tool records the lengths (or times) and segment counts for light paths arriving at the pixel. Such multipath information can provide a characterization of the temporal light density of light that arrives at the pixel in response to one or more pulses of light. The graphics tool can use stratification and/or priority sampling to reduce variance in recorded light path samples. Realistic, physically-accurate simulation of multipath light phenomena can, in turn, help calibrate a TOF camera so that it more accurately estimates the depths of real world objects observed using the TOF camera. Various ways to improve the process of inferring imaging conditions such as depth, reflectivity, and ambient light based on images captured using a TOF camera are also described.

20 Claims, 10 Drawing Sheets

(3 of 10 Drawing Sheet(s) Filed in Color)

(51) Int. Cl.

| | | |
|---|---|---|
| *G01S 17/89* | (2006.01) | |
| *G01S 7/491* | (2006.01) | |
| *G01S 7/486* | (2006.01) | |
| *G01S 7/497* | (2006.01) | |
| *G06K 9/46* | (2006.01) | |
| *G06K 9/62* | (2006.01) | |

(52) U.S. Cl.
CPC ............ *G01S 7/4918* (2013.01); *G01S 17/89* (2013.01); *G06K 9/4661* (2013.01); *G06K 9/6278* (2013.01); *G06T 15/005* (2013.01); *G06T 2207/10028* (2013.01); *G06T 2215/16* (2013.01)

(56) References Cited

U.S. PATENT DOCUMENTS

| | | | |
|---|---|---|---|
| 8,670,029 | B2 | 3/2014 | McEldowney |
| 8,717,469 | B2 | 5/2014 | Felzenshtein et al. |
| 8,849,616 | B2 | 9/2014 | Mehta et al. |
| 9,213,883 | B2 | 12/2015 | Kim et al. |
| 9,760,837 | B1 | 9/2017 | Nowozin et al. |
| 2004/0101043 | A1 | 5/2004 | Flack et al. |
| 2006/0256112 | A1* | 11/2006 | Heirich .......................... 345/427 |
| 2011/0025843 | A1 | 2/2011 | Oggier et al. |
| 2012/0033045 | A1 | 2/2012 | Schweizer et al. |
| 2012/0105587 | A1 | 5/2012 | Lee et al. |
| 2012/0154535 | A1 | 6/2012 | Yahav et al. |
| 2012/0185094 | A1 | 7/2012 | Rosenstein et al. |
| 2012/0212496 | A1* | 8/2012 | Kulla ............................ 345/501 |
| 2014/0122381 | A1 | 5/2014 | Nowozin |
| 2014/0185921 | A1 | 7/2014 | Choi et al. |
| 2014/0340569 | A1 | 11/2014 | Raskar et al. |
| 2015/0015569 | A1 | 1/2015 | Jung et al. |
| 2015/0049347 | A1 | 2/2015 | Laffargue et al. |
| 2015/0071526 | A1 | 3/2015 | Nguyen et al. |
| 2015/0109414 | A1 | 4/2015 | Adam et al. |
| 2015/0193938 | A1 | 7/2015 | Freedman et al. |
| 2015/0221194 | A1 | 8/2015 | Sarkar |
| 2015/0235351 | A1 | 8/2015 | Mirbach et al. |
| 2015/0248764 | A1 | 9/2015 | Keskin et al. |
| 2016/0034810 | A1 | 2/2016 | Hershey et al. |
| 2017/0032222 | A1 | 2/2017 | Sharma et al. |

OTHER PUBLICATIONS

International Search Report and Written Opinion dated Jul. 1, 2016, from International Patent Application No. PCT/US2016/026294, 15 pp.
Jimenez et al., "Modelling and Correction of Multipath Interference in Time of Flight Cameras," *IEEE Conf. on Computer Vision and Pattern Recognition*, pp. 893-900 (Jun. 2012).
Breiman et al., *Classification and Regression Trees*, Ch. 1, 2, 8, and 11, pp. 1-58, 216-265, and 297-317 (Jan. 1984).
Hansard et al., *Time-of-Flight Cameras—Principles, Methods and Applications*, Ch. 1-3, pp. 1-58 (Nov. 2012).
Pharr et al., *Physically Based Rendering: From Theory to Implementation*, Ch. 1.2, 5-8, 12, 13.4, 14-17, pp. 4-15, 261-474, 606-633, 652-659, and 680-986 (Jul. 2010).
Written Opinion of the International Preliminary Examining Authority dated Apr. 7, 2017, from International Patent Application No. PCT/US2016/026294, 8 pp.
International Preliminary Report on Patentability dated Jul. 20, 2017, from International Patent Application No. PCT/US2016/026294, 10 pp.
Adam et al., "Bayesian Time-of-Flight for Realtime Shape, Illumination and Albedo," *IEEE Trans. on Pattern Analysis and Machine Intelligence*, vol. 39, Issue 5, pp. 851-864 (May 2017).
Chan et al., "A Noise-Aware Filter for Real-Time Depth Upsampling," *Proc. 10th European Conf. on Computer Vision—Workshop on Multi-camera and Multi-modal Sensor Fusion Algorithms and Applications*, pp. 1-12 (Oct. 2008).

Haykin et al., *Neural Networks and Learning Machines*, pp. 201-202 (Jan. 2009).
Jiang et al., "Spatio-Temporal Segmentation with Depth-Inferred Videos of Static Scenes," Technical Report of Zhejiang University, pp. 1-19 (Sep. 2010).
Mutny et al., "Learning the Correction for Multi-Math Deviations in Time-of-Flight Cameras," 7 pp. (Jan. 2016).
Park et al., "High Quality Depth Map Upsampling for 3D-TOF Cameras," *IEEE Int'l Conf. on Computer Vision*, 8 pp. (Nov. 2015).
Zhu et al., "Spatial-Temporal Fusion for High Accuracy Depth Maps Using Dynamic MRFs," *IEEE Trans. on Pattern Analysis and Machine Intelligence*, vol. 32, Issue 5, pp. 1-10 (May 2010).
Barron et al., "Intrinsic Scene Properties from a Single RGB-D Image," *IEEE Conf. on Computer Vision and Pattern Recognition*, 8 pp. (Jun. 2013).
Barron et al., "Shape, Albedo, and Illumination from a Single Image of an Unknown Object," *IEEE Conf. on Computer Vision and Pattern Recognition*, 8 pp. (Jun. 2012).
Barron et al., "Shape, Illumination, and Reflectance from Shading," University of California at Berkeley Technical Report No. UCB/EECS-2013-117, 21 pp. (May 2013).
Berger, "Statistical Decision Theory and Bayesian Analysis," Second Edition, pp. 1-12, 16-19, 60-64, and 82-88 (Aug. 1985).
Bucila et al., "Model Compression," *ACM Int'l Conf. on Knowledge Discovery and Data Mining*, pp. 535-541 (Aug. 2006).
Criminisi et al., "Decision Forests: A Unified Framework for Classification, Regression, Density Estimation, Manifold Learning and Semi-Supervised Learning," *Journal of Foundations and Trends in Computer Graphics and Vision*, vol. 7, Issue 2-3, 150 pp. (Feb. 2012).
Dawid, "The Well-Calibrated Bayesian," *Journal of the American Statistical Association*, vol. 77, No. 379, pp. 605-610 (Sep. 1982).
Duffield et al., "Priority Sampling for Estimation of Arbitrary Subset Sums," *Journal of the ACM*, vol. 54, No. 6, 37 pp. (Dec. 2007).
Finlayson et al., "Removing Shadows from Images," *European Conf. on Computer Vision*, 14 pp. (May 2002).
Foi et al., "Practical Poissonian-Gaussian Noise Modeling and Fitting for Single-image Raw-data," *IEEE Trans. on Image Processing*, vol. 17, No. 10, 18 pp. (Oct. 2008).
Fuchs, "Multipath Interference Compensation in Time-of-Flight Camera Images," *IEEE Int'l Conf on Pattern Recognition*, pp. 3583-3586 (Aug. 2010).
Gehler et al., "Recovering Intrinsic Images with a Global Sparsity Prior on Reflectance," *Proc. of Advances in Neural Information Processing Systems*, 9 pp. (Dec. 2011).
Genz et al., "Remarks on Algorithm 006: An Adaptive Algorithm for Numerical Integration over an N-dimensional Rectangular Region," *Journal of Computational and Applied Mathematics*, vol. 6, No. 4, 8 pp. (Dec. 1980).
Green, "Reversible Jump Markov Chain Monte Carlo Computation and Bayesian Model Determination," *Biometrika*, vol. 82, No. 4, pp. 711-732 (Dec. 1995).
Gupta et al., "Phasor Imaging: A Generalization of Correlation-Based Time-of-Flight Imaging," *ACM Transactions on Graphics*, 22 pp. (Feb. 2015).
Han et al., "Enhanced Computer Vision with Microsoft Kinect Sensor: A Review," *IEEE Trans. on Cybernetics*, vol. 43, No. 5, pp. 1318-1334 (Oct. 2013).
Haralick, "Propagating Covariance in Computer Vision," *Int'l Journal on Pattern Analysis and Machine Intelligence*, vol. 10, Issue 5, 17 pp. (Aug. 1996).
Healey et al., "Radiometric CCD Camera Calibration and Noise Estimation," *IEEE Trans. on Pattern Analysis and Machine Intelligence*, vol. 16, No. 3, pp. 267-276 (Mar. 1994).
Isard et al., "Condensation—Conditional Density Propagation for Visual Tracking," *Int'l Journal of Computer Vision*, vol. 29, No. 1, pp. 5-28 (Aug. 1998).
Izadi et al., "KinectFusion: Real-Time Dynamic 3D Surface Reconstruction and Interaction," *ACM SIGGRAPH*, 1 p. (Aug. 2011).
Jakob, "Mitsuba—Physically Based Renderer," downloaded from the World Wide Web, 2 pp. (2010).
Kirkpatrick et al., "Optimization by Simulated Annealing," *Science*, vol. 220, No. 4598, pp. 671-680 (May 1983).

(56) References Cited

OTHER PUBLICATIONS

Kirmani et al., "SPUMIC: Simultaneous Phase Unwrapping and Multipath Interference Cancellation in Time-of-Flight Cameras Using Spectral Methods," *IEEE Int'l Conf. on Multimedia and Expo*, 6 pp. (Jul. 2013).

Kong, "A Note on Importance Sampling Using Standardized Weights," University of Chicago, Department of Statistics, Technical Report No. 348, 4 pp. (Jul. 1992).

Lange et al., "Solid-State Time-of-Flight Range Camera," *IEEE Journal of Quantum Electronics*, vol. 37, No. 3, pp. 390-397 (Mar. 2001).

Lefloch et al., "Technical Foundation and Calibration Methods for Time-of-Flight Cameras," *Lecture Notes in Computer Science*, vol. 8200, 20 pp. (Sep. 2013).

Liu, "Metropolized Independent Sampling with Comparisons to Rejection Sampling and Importance Sampling," *Statistics and Computing*, vol. 6, pp. 113-119 (Jun. 1996).

Liu, "Monte Carlo Strategies in Scientific Computing," 34 pp. (Mar. 2002).

Liu et al., "On the Limited Memory BFGS Method for Large Scale Optimization," *Mathematical Programming*, 27 pp. (Dec. 1989).

Meister et al., "Photon Mapping Based Simulation of Multi-Path Reflection Artifacts in Time-of-Flight Sensors," *Technical Report*, 7 pp. (document not dated—downloaded on Mar. 5, 2015).

Newcombe et al., "KinectFusion: Real-Time Dense Surface Mapping and Tracking," *IEEE Int'l Symp. on Mixed and Augmented Reality*, 10 pp. (Oct. 2011).

Payne et al., "Illumination Waveform Optimization for Time-of-Flight Range Imaging Cameras," *Proc. SPIE Optical Metrology*, 13 pp. (Jun. 2011).

Pitts et al., "Time-of-Flight Tracer," Microsoft Research MSR-TR-2014-142, 22 pp. (Nov. 2014).

Reynolds et al., "Capturing Time-of-Flight Data with Confidence," *IEEE Computer Vision and Pattern Recognition*, pp. 945-952 (Jun. 2011).

Robert, "The Bayesian Choice—From Decision-Theoretic Foundations to Computational Implementation," 615 pp. (Feb. 2007).

Rubinstein et al., "Simulation and the Monte Carlo Method," 79 pp. (Dec. 2007).

Schwarte et al., "New Electro-optical Mixing and Correlating Sensor: Facilities and Applications of the Photonic Mixer Device (PMD)," *Proc. SPIE Sensors, Sensor Systems, and Sensor Data Processing*, 9 pp. (Sep. 1997).

Shao et al., "Computer Vision for RGB-D Sensors: Kinect and Its Applications," *IEEE Trans. on Cybernetics*, vol. 43, No. 5, pp. 1314-1317 (Oct. 2013).

Shim et al., "Recovering Translucent Objects using a Single Time-of-Flight Depth Camera," *IEEE Trans. on Circuits and Systems for Video Technology*, 14 pp. (Feb. 2015).

Shotton et al., "Efficient Human Pose Estimation from Single Depth Images," *IEEE Trans. on Pattern Analysis and Machine Intelligence*, vol. 35, No. 12, 21 pp. (Dec. 2013).

Shotton et al., "Real-Time Human Pose Recognition in Parts from Single Depth Images," *IEEE Conf. on Computer Vision and Pattern Recognition*, 8 pp. (Jun. 2011).

Tadmor et al., "A Fast Global Shutter Image Sensor Based on the VOD Mechanism," *Journal of IEEE Sensors*, 4 pp. (Nov. 2014).

Thrun et al., "Probabilistic Robotics," *MIT Press*, 492 pp. (Sep. 2005).

Trefethen, "Approximation Theory and Approximation Practice," *SIAM Int'l Conf. on Data Mining*, 121 pp. (Jun. 2011).

Veach et al., "Metropolis Light Transport," *Conf. on Computer Graphics and Interactive Technique*, 12 pp. (Aug. 1997).

Xiao et al., "Shadow Removal from Single RGB-D Images," *IEEE Conf. on Computer Vision and Pattern Recognition*, 8 pp. (Jun. 2014).

\* cited by examiner

FIG. 6a  rendered image of scene 601
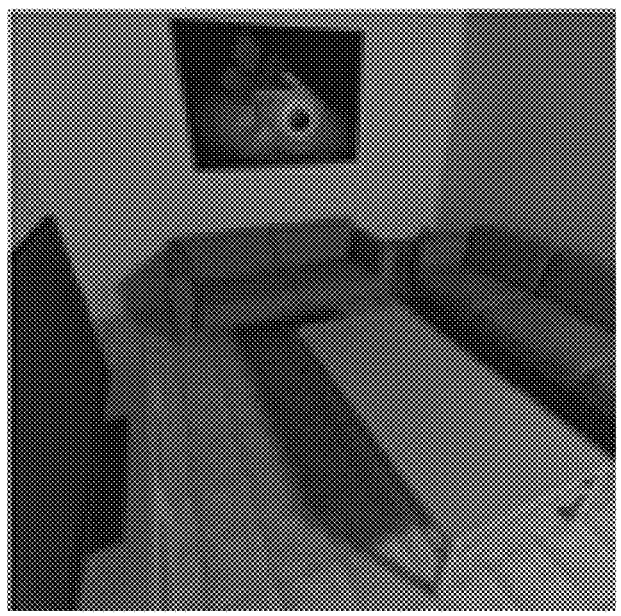
FIG. 6b  map 602 of ground truth depth
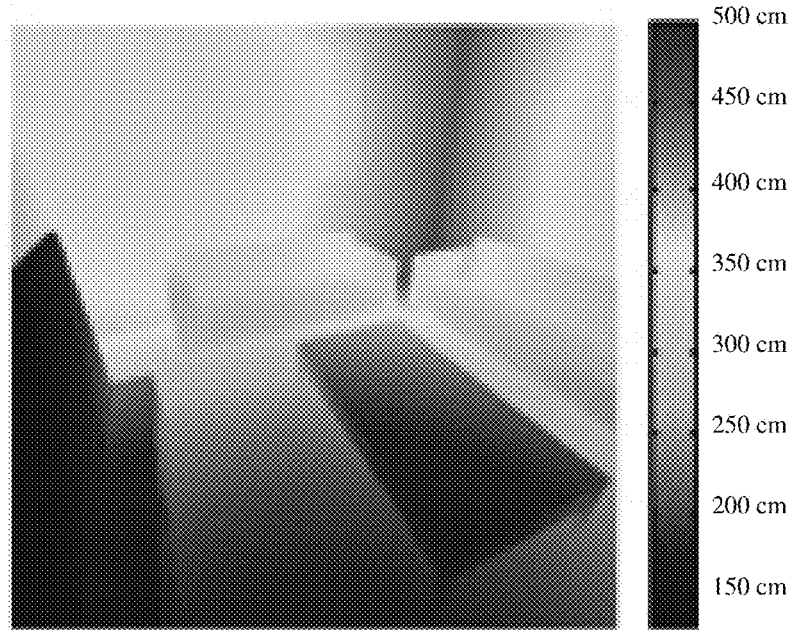

FIG. 6c    map 603 of multipath ratios
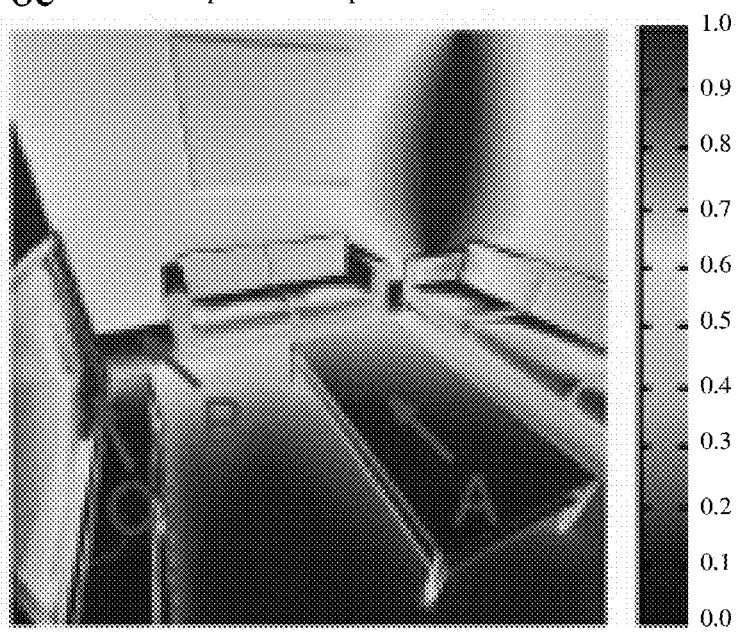
FIG. 6d
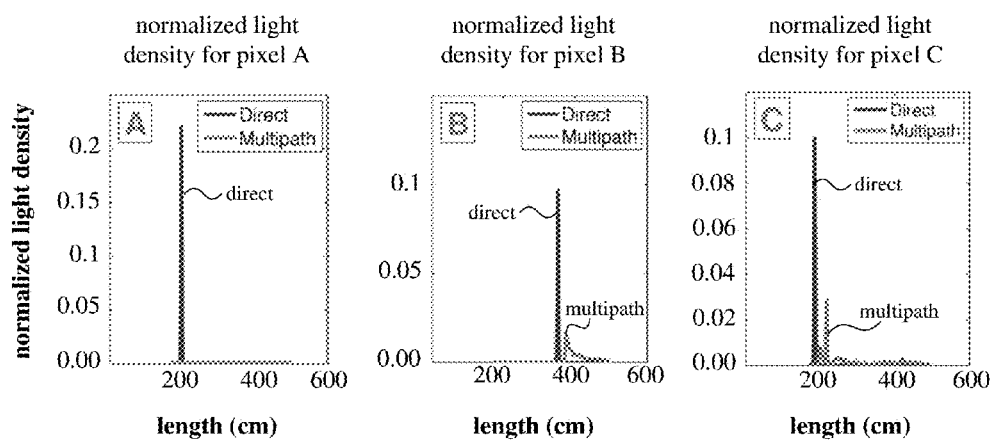

FIG. 7a    response curves 700 for different exposure profiles
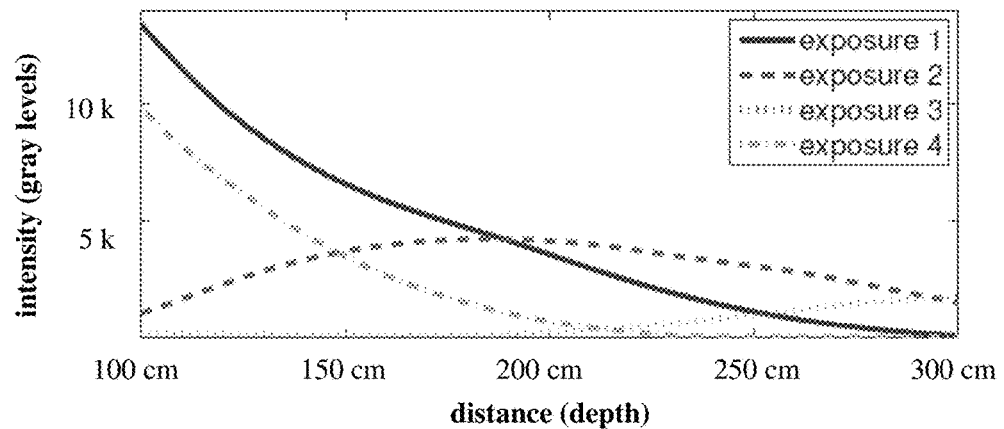
FIG. 7b    delay-compensated response curves 710
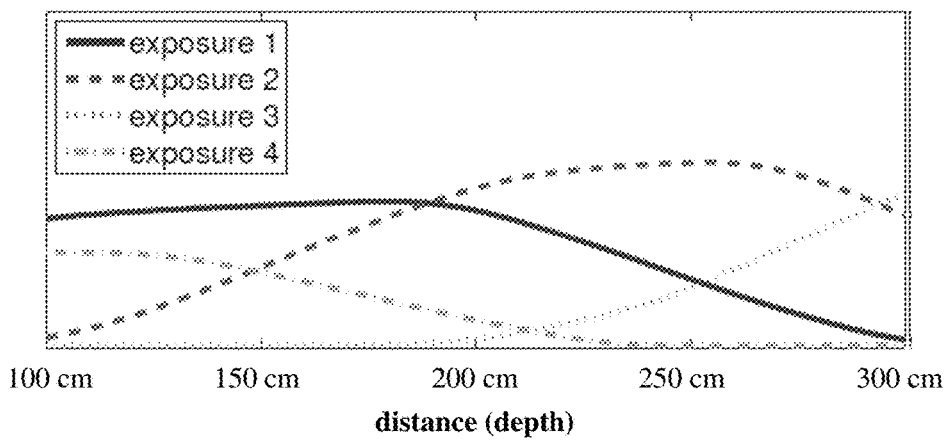
FIG. 8
basis element $j = (\delta, wd)$,
defining $B_j(\cdot)$
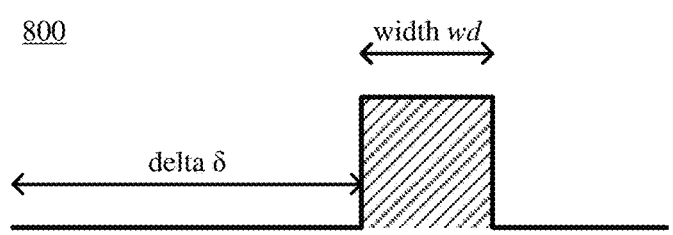

FIG. 9   900   response curves for four exposure profiles after 20k iterations (a), 40k iterations (b) and 100k iterations (c)
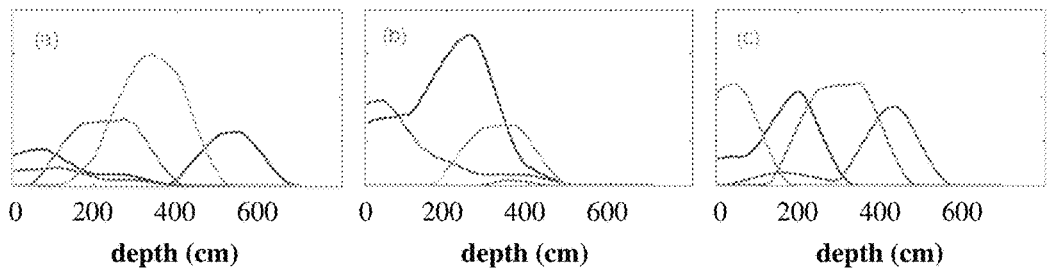
FIG. 10
1000
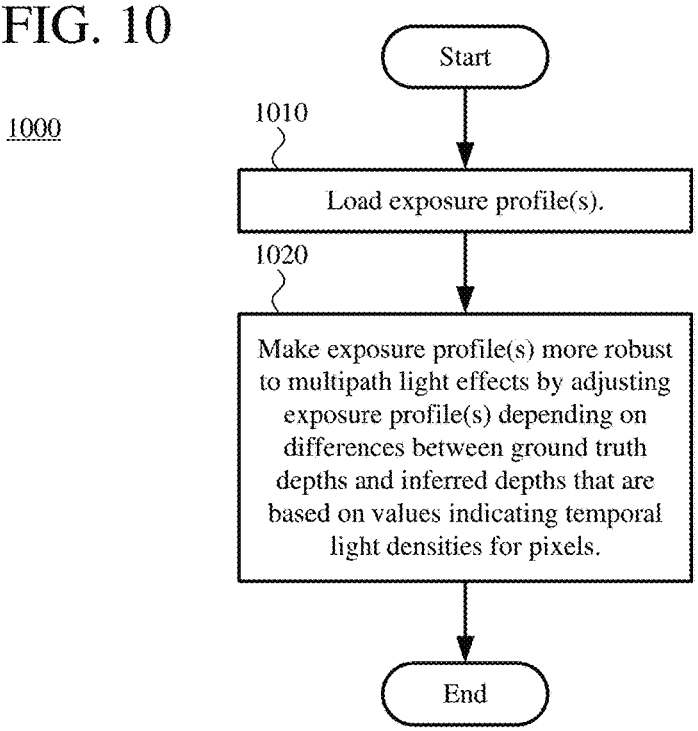

TIME-OF-FLIGHT SIMULATION OF MULTIPATH LIGHT PHENOMENA

BACKGROUND

In computer graphics, a scene can include a set of two-dimensional ("2D") objects and/or three-dimensional ("3D") objects. A description of the scene (sometimes called a scene file) may include details about the geometry of objects in the scene, texture of objects in the scene, lighting in the scene, and shading of objects in the scene. To view the scene, an image of the scene is "rendered" by generating the image from the objects in a scene. A rendering tool (sometimes called a rendering engine or renderer) processes the description of a scene and outputs an image from a particular vantage point or perspective.

To account for the effects of lighting in a scene, a rendering tool may perform complex calculations to model the behavior of light emitted by a (virtual) light source until that light reaches a virtual camera (light sensor), which yields the rendered image. For example, the rendering tool may track the light paths of rays of light emitted by a light source within a scene, following the light paths as they are reflected between surfaces in the scene, until the light paths reach the virtual camera. At the virtual camera, light paths that reach a given pixel of the rendered image are integrated into a single light intensity value for that pixel (e.g., for a red (R) value, green (G) value, or blue (B) value at a position). Thus, the intensity value for the pixel aggregates light of any light paths directly from the light source to the virtual camera at the pixel, light of any light paths reflected by a single surface before reaching the virtual camera at the pixel, and light for any light paths reflected between multiple surfaces in the scene before reaching the virtual camera at the pixel. Depending on the sophistication of the rendering tool, the rendering tool may account for multiple light sources, ambient light in the scene, and complex effects such as light scattering at surfaces in the scene.

SUMMARY

In summary, the detailed description presents examples of time-of-flight ("TOF") simulation of multipath light phenomena. For example, in addition to recording light intensity for a pixel, a graphics tool records the lengths (or times) and segment counts for light paths arriving at the pixel. Such multipath information can provide a characterization of the temporal light density of light that arrives at the pixel in response to one or more pulses of light. Realistic, physically-accurate simulation of multipath light phenomena can, in turn, help calibrate a TOF camera so that it more accurately estimates the depths of real world objects observed using the TOF camera.

According to one aspect of the innovations described herein, a graphics tool loads a scene file for a scene having multiple surfaces. For light that illuminates the scene (e.g., one or more light pulses that actively illuminate the scene, possibly in combination with ambient light that illuminates the scene), the graphics tool captures temporal light density at a given pixel of a camera (e.g., a virtual camera having a light sensor). In doing so, the graphics tool records a set of multiple light path samples for the given pixel. Each of the multiple light path samples for the given pixel includes an intensity weight for a light path and path information for the light path (e.g., a count of straight path segments for the light path, a duration or distance of the light path). The graphics tool can use variance reduction techniques such as stratification and/or priority sampling to reduce variance in the recorded light path samples. The graphics tool can also use priority sampling to reduce the memory or storage cost for light path samples.

According to another aspect of the innovations described herein, a calibration tool loads one or more exposure profiles, which may be used in a depth camera. The calibration tool makes the exposure profile(s) more robust to multipath light effects. In particular, the calibration tool adjusts the exposure profile(s) depending on differences between ground truth depths and inferred depths that are based at least in part on values indicating temporal light densities for pixels.

The detailed description also presents various ways to improve the process of inferring imaging conditions such as depth, reflectivity (also called albedo), and ambient light based on images captured using a TOF camera. For example, several ways to speed up the process of inferring imaging conditions are presented.

The innovations can be implemented as part of a method, as part of a computer system configured to perform the method, or as part of computer-readable media storing computer-executable instructions for causing a processor, when programmed thereby, to perform the method. The computer-readable media do not include carrier waves or signals per se. The various innovations can be used in combination or separately. The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 6a-6c are screenshots illustrating a rendered image of a scene, ground truth depth values for pixels of the rendered image, and multipath ratios for the pixels of the rendered image, respectively.

FIG. 6d includes diagrams illustrating normalized light densities for example pixels of the rendered image of FIG. 6c.

FIGS. 7a and 7b are diagrams illustrating response curves for different representations of exposure profiles.

FIG. 8 is a diagram illustrating attributes of a boxcar function representing a basic gain profile.

FIG. 9 includes diagrams illustrating adjustments to exposure profiles.

FIG. 10 is a flowchart illustrating a generalized technique for adjusting exposure profile(s) to make them more robust to multipath light effects.

DETAILED DESCRIPTION

Figure 1:
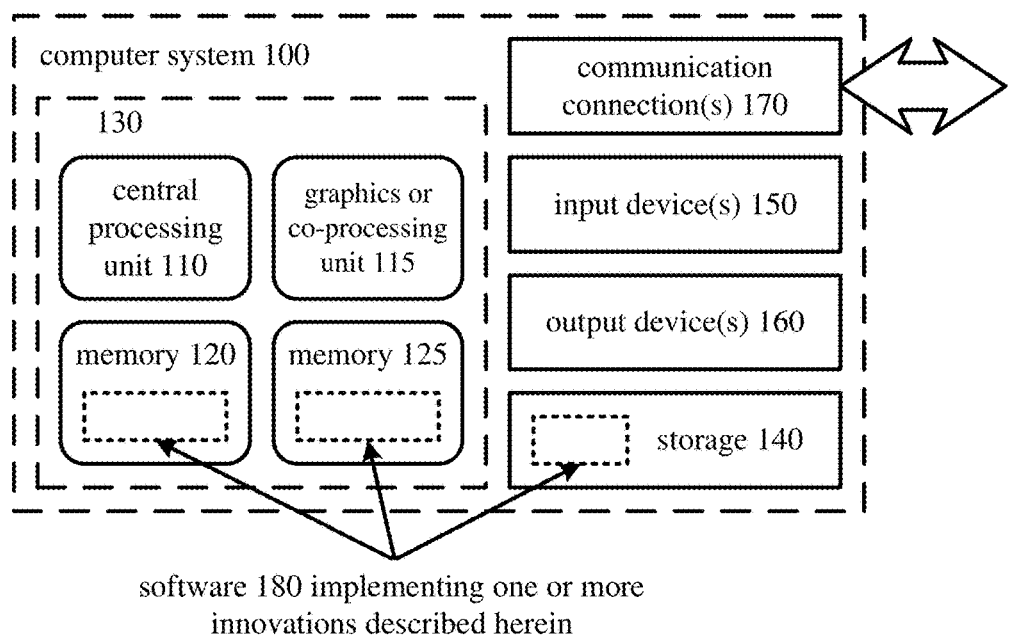
FIG. 1 is a diagram illustrating an example computer system in which some of the innovations described herein can be implemented.

The detailed description presents examples of time-of-flight ("TOF") simulation of multipath light phenomena. The results of realistic, physically-accurate simulation of multipath light phenomena can help calibrate a TOF camera so that it more accurately estimates the imaging conditions (such as depth, albedo/reflectivity, and ambient light) under which real world objects have been observed.

In general, a pulsed TOF camera operates by sending a light pulse into a scene and integrating the reflected pulse using one or more exposure profiles. The recorded signal can be used to estimate depth (or another imaging condition such as ambient light level or albedo) for each pixel of a rendered image of the scene. When inferring imaging conditions using a TOF camera, one complication is how to handle multipath light effects, which are effects due to reflections of light between surfaces within the scene. In particular, multipath light effects can lead to systematic errors in estimated depth values. The results of physically-accurate characterization of multipath light phenomena, as described herein, can be used to calibrate exposure profiles used in a TOF camera, so as to make the TOF camera more robust to the effects of multipath light phenomena during real world operation. It can also be used to check the results of inferring imaging conditions in synthetic but physically-accurate benchmarking.

The detailed description also presents various ways to improve the process of inferring imaging conditions based on images captured using a pulsed TOF camera, which is characterized by flexible, general exposure profiles. For example, to speed up the inference process, efficient non-parametric regression trees can be used to approximate the outputs of a probabilistic model for shape, illumination and albedo inference in a pulsed TOF camera, which accurately relates imaging conditions to observed camera responses. As a result, faster than video frame rate estimates of imaging conditions can be provided for each pixel, along with estimates of uncertainty for those inferred imaging conditions.

As used herein, in the context of recording light signals, the term "pixel" means a point at which a sample represents an intensity value. For example, a pixel can be a red (R) value, green (G) value, or blue (B) value. In the context of inferring imaging conditions, the term "pixel" can mean a point at which a sample represents an intensity value, or it can mean a set of such samples at a given spatial position (e.g., the set of R, G, and B values at a given spatial position). Thus, for example, imaging conditions can be inferred for a given sample (example of "pixel") of an image, or the imaging conditions can be inferred for a given spatial position (example of "pixel") of the image that includes multiple samples.

In summary, innovations described herein include, but are not limited to, innovations in the areas of:

- physically-accurate TOF simulation of multipath light phenomena (e.g., by extending physically-accurate rendering techniques to the temporal domain);
- using physically-accurate TOF simulation for benchmarking purposes;
- using variance reduction techniques such as stratification and priority sampling to improve the accuracy and/or efficiency of TOF simulation of multipath light phenomena;
- designing exposure profiles to improve accuracy under task-derived imaging conditions;
- using regression to enable real-time inference of imaging conditions under tight constraints on memory and computational resources;
- providing robust, video-rate shape, illumination, and reflectance estimation both indoors and outdoors at direct sunlight; and
- providing accurate depth uncertainty estimates.

More generally, various alternatives to the examples presented herein are possible. For example, some of the methods presented herein can be altered by changing the ordering of the method acts described, by splitting, repeating, or omitting certain method acts, etc. The various aspects of the disclosed technology can be used in combination or separately. Different embodiments use one or more of the described innovations. Some of the innovations presented herein address one or more of the problems noted in the background. Typically, a given technique/tool does not solve all such problems.

I. Operating Environment

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems.

With reference to FIG. 1, the computer system (100) includes one or more processing units (110, 115) and memory (120, 125). The processing units (110, 115) execute computer-executable instructions. A processing unit can be a general-purpose CPU, processor in an ASIC or any other type of processor. In a multi-processing system, multiple processing units execute computer-executable instructions to increase processing power. For example, FIG. 1 shows a CPU (110) as well as a GPU or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations described herein, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The tangible storage (140) may be removable or non-removable, and includes magnetic disks, magnetic tapes or cassettes, optical storage media such as CD-ROMs or DVDs, or any other medium which can be used to store information and which can be accessed within the computer system (100). The storage (140) stores instructions for the software (180) implementing one or more innovations described herein.

The input device(s) (150) may be a touch input device such as a keyboard, mouse, pen, or trackball, a voice input device, a scanning device, or another device that provides input to the computer system (100). For video or image input, the input device(s) (150) may be a camera, video card, TV tuner card, screen capture module, or similar device that accepts video input in analog or digital form, or a CD-ROM or CD-RW that reads video input into the computer system (100). The output device(s) (160) include a display device. The output device(s) may also include a printer, speaker, CD-writer, or another device that provides output from the computer system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations presented herein can be described in the general context of computer-readable media. Computer-readable media are any available tangible media that can be accessed within a computing environment. By way of example, and not limitation, with the computer system (100), computer-readable media include memory (120, 125), storage (140), and combinations of any of the above. As used herein, the term computer-readable media does not cover, encompass, or otherwise include carrier waves or signals per se.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a GPU, or a programmable logic device ("PLD") such as a field programmable gate array ("FPGA")) specially designed or configured to implement any of the disclosed methods.

For the sake of presentation, the detailed description uses terms like "determine," "set," and "use" to describe computer operations in a computer system. These terms are high-level abstractions for operations performed by a computer, and should not be confused with acts performed by a human being. The actual computer operations corresponding to these terms vary depending on implementation.

II. Example Tools

Figure 2:
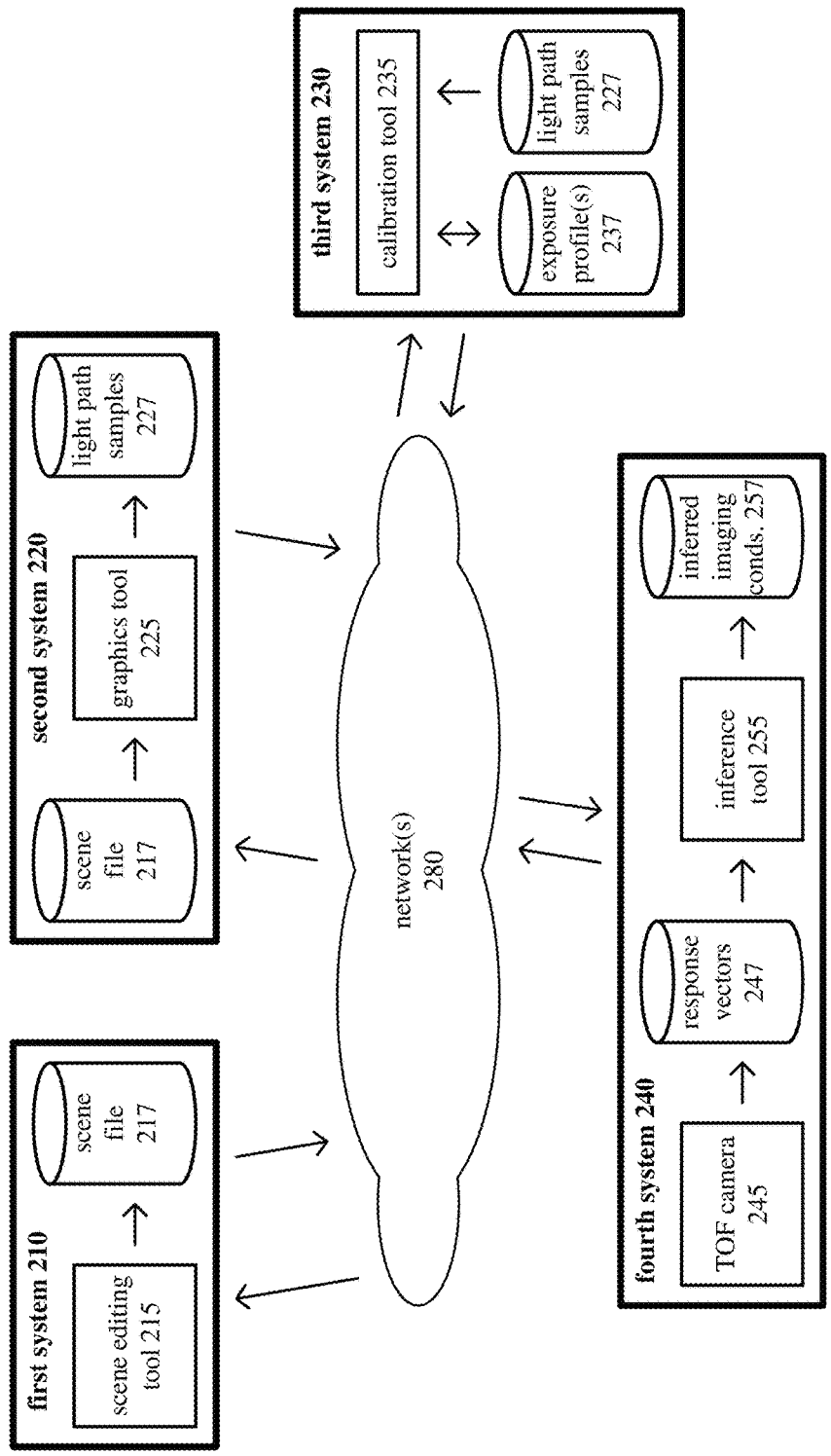
FIG. 2 is a diagram illustrating an example environment including tools for TOF simulation, calibration of exposure profiles, and inference of imaging conditions.

FIG. 2 shows an example environment (200) including tools for TOF simulation of multipath light phenomena, calibration of exposure profiles, and inference of imaging conditions. In FIG. 2, four computer systems (210, 220, 230, 240) are separated by one or more computer networks (280), such as the Internet or another computer network.

The first computer system (210) includes a scene editing tool (215) that produces a scene file (217). For example, the scene editing tool (215) is a version of Blender software. Alternatively, the scene editing tool (215) is another type of scene editing tool. The scene file (217) may include details such as 3D coordinates defining the geometry of objects in a scene, properties of the texture of objects in the scene (e.g., reflection coefficients, frequencies absorbed/reflected), and characteristics of lighting/shading in the scene. The scene file (217) is conveyed over the network(s) (280) to the second computer system (220).

The second computer system (220) includes a graphics tool (225) (e.g., a rendering tool), a buffer configured to store the scene file (217) for a scene, and a buffer configured to store light path samples (227). The graphics tool is configured to capture, for light that illuminates a scene having multiple surfaces, temporal light density at a given pixel of a camera using TOF simulation of multipath light effects in the scene. The graphics tool (225) accepts the scene file (217) as input and produces light path samples (227) for one or more pixels. For example, the graphics tool (225) is a modified version of Mitsuba rendering software, which has been extended to record light path information that quantifies temporal light density for pixels. Details about example modifications to Mitsuba software are presented in section III. Alternatively, the graphics tool (225) is another type of graphics tool. Generally, the graphics tool can be configured to record, for a given pixel, values indicating temporal light density that arises from one or more light pulses. Thus, for a given pixel, the TOF simulation can organize intensity weights for different light paths in the temporal domain. The light path samples (227) are conveyed over the network(s) (280) to the third computer system (230) for calibration of exposure profiles. The light path samples (227) can also be conveyed to one or more other computer systems for other purposes.

The third computer system (230) includes a calibration tool (235), a buffer configured to store one or more exposure profiles (237), and a buffer configured to store light path samples (227). The calibration tool (235) calibrates the exposure profile(s) (237) for a TOF camera to make the exposure profile(s) (237) more robust to multipath light effects. The calibration tool (235) accepts initial versions of the exposure profile(s) (237) as input, along with the light path samples recorded by the graphics tool (225). The calibration tool (235) may also accept as input certain information (not shown) from the scene file (217). In general, the calibration tool (235) adjusts the exposure profile(s) (237) so as to minimize differences between ground truth depth values (from the scene file (217)) and depth values inferred using the light path samples (227) and exposure profile(s) (237). Section IV describes example approaches to adjusting exposure profiles to make them more robust to multipath light effects.

The fourth computer system (240) includes a TOF camera (245) and buffer configured to store observed response vectors (247). The TOF camera (245) incorporates the exposure profile(s) (237). The TOF camera (245) produces one or more response vectors (247) based on observation. Based on the response vector(s) (247), an inference tool (255) infers the imaging conditions (257) under which the response vector(s) (247) were observed. Another buffer is configured to store the inferred imaging conditions (257). Section V describes example approaches to inferring imaging conditions (such as depth, ambient light levels, and albedo) based on observed response vectors.

Alternatively, the tools shown in FIG. 2 can be included on fewer computer systems. For example, a single computer system includes all of the tools shown in FIG. 2. Or, the scene editing tool (215) and graphics tool (225) are included on a single computer system. Or, the scene editing tool (215), graphics tool (225), and calibration tool (235) are included on a single computer system.

III. TOF Simulation of Multipath Light Phenomena

This section describes various features of time-of-flight ("TOF") simulation of multipath light phenomena. For example, this section describes extensions of a physically-accurate rendering tool for TOF simulation of multipath light phenomena. The rendering tool, in response to a pulse of light, records not just light intensity values (as in normal rendering) but also light path lengths (or durations) and path segment counts for light arriving at the respective pixels of a camera (e.g., virtual camera having a light sensor). This information (which is an example of light path samples) quantifies the temporal light density of light from the light pulse that arrives at the pixels. This section also describes ways to reduce variance of light path samples and reduce the memory/storage costs for light path samples. As described in later sections, realistic TOF simulation of multipath light phenomena facilitates design and calibration of exposure profiles that are resilient to multipath light effects, and it also facilitates benchmarking tests. Alternatively, the results of realistic TOF simulation of multipath light phenomena can be used for other purposes.

A. Examples of Multipath Light Effects

Figure 3:
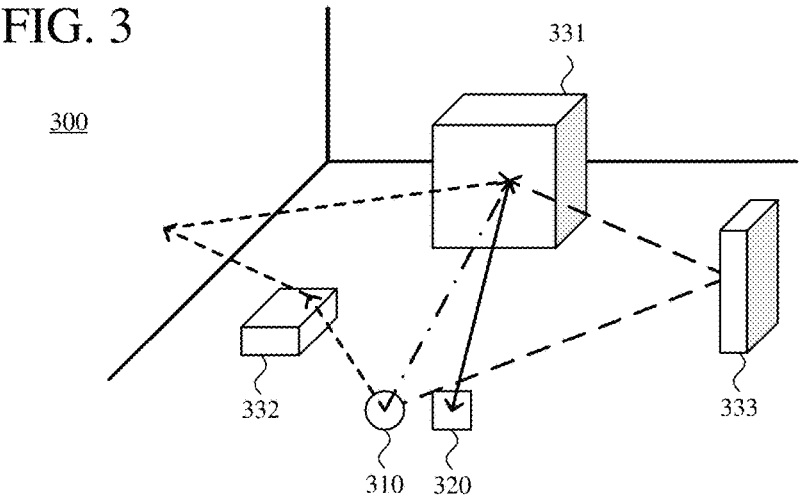
FIG. 3 is a diagram illustrating examples of multipath light effects in a scene for light captured at a pixel of a camera.

FIG. 3 illustrates examples of multipath light effects in a scene for light captured at a pixel of a virtual camera. FIG. 3 shows an example scene (300) that includes multiple 3D objects (331, 332, 333) having surfaces as well as other 2D objects (walls, floor) having surfaces. A light source (310), which is a virtual light source, emits one or more pulses of light. The light emitted by the light source (310) is modeled as light paths that are reflected within the scene (300). Light along at least some of the light paths eventually arrives at a light sensor (320), which is for the virtual camera. In FIG. 3, the light source (310) and light sensor (320) are shown as being close together. In practice, the light source (310) and light sensor (320) can be co-located to emulate likely configurations in a TOF camera. Alternatively, the light source (310) and light sensor (320) can be located in other positions.

When the light source (310) emits a pulse of light, light travels away from the light source (310) along many light paths. FIG. 3 shows three examples of light paths, which are labeled light path A, light path B, and light path C. In general, a light path includes one or more light path segments. A light path segment is part of a light path between one surface (or the light source (310)) and another surface (or the light sensor (320)). When light is emitted from the light source (310), the light travels along a light path segment until it hits a surface or the light sensor (320). When it hits the light sensor (320), the light is absorbed at a particular location associated with a pixel. When it hits a point on a surface, the light may be absorbed, reflected, or partially absorbed and partially reflected. When reflected, light may be scattered such that it travels in multiple light path segments away from the point on the surface.

Light path A includes two light path segments. Light travels along a first segment of light path A towards an object (331). Reflected (at least partially) from a point on a surface of the object (331), light travels along another segment of light path A to the light sensor (320), where the light is absorbed at a location for a given pixel. (Other light path segments scattered from the point on the surface of the object (331) are not shown.)

Light path B includes four light path segments. Light travels along a first segment of light path B towards an object (332), is (at least partially) reflected from a point on the surface of the object (332) towards a wall (second segment of light path B), and then is (at least partially) reflected from a point on the surface of the wall towards another object (331) (third segment of light path B). Then, reflected from the point on the surface of the object (331), light travels along the final segment of light path B to the light sensor (320), where the light is absorbed at the location for the given pixel. (Other light path segments scattered from the points on the surfaces of the object (331, 332) and wall are not shown.)

Similarly, light path C includes three light path segments. Light travels along the segments of light path C until the light is absorbed by the light sensor (320) at the location for the given pixel.

Tracking light along light paths can quickly become complicated. For just one pixel, light may travel along any of thousands of light paths before the light is absorbed by the light sensor (320) at the location for the pixel. Conventionally, the light absorbed for a given pixel is integrated, such that a single intensity value results for the pixel (e.g., for a red (R) value, green (G) value, or blue (B) value at a position) regardless of the light paths along which the light has traveled. Below, variations are described in which light path information (e.g., count of light path segments, length or duration of light paths) is also recorded. Together with light intensity values, the light path information can quantify the density of light arriving at a location for a pixel over time (temporal light density).

In some cases, most of the light that is absorbed for a given pixel is directly reflected at a point of a single surface in the scene (300). That is, there are few significant light paths with more than two light path segments. For such cases, multipath light effects are not significant, and conventional TOF imaging may yield a reliable estimate for depth.

In other cases, much less of the light absorbed for a given pixel is directly reflected at a point of a single surface in the scene (300). Instead, there are many significant light paths with more than two light path segments. For such cases, multipath light effects are significant, and conventional TOF imaging may yield an unreliable estimate for depth.

B. TOF Simulation of Multipath Light Effects, Generally

Figure 4:
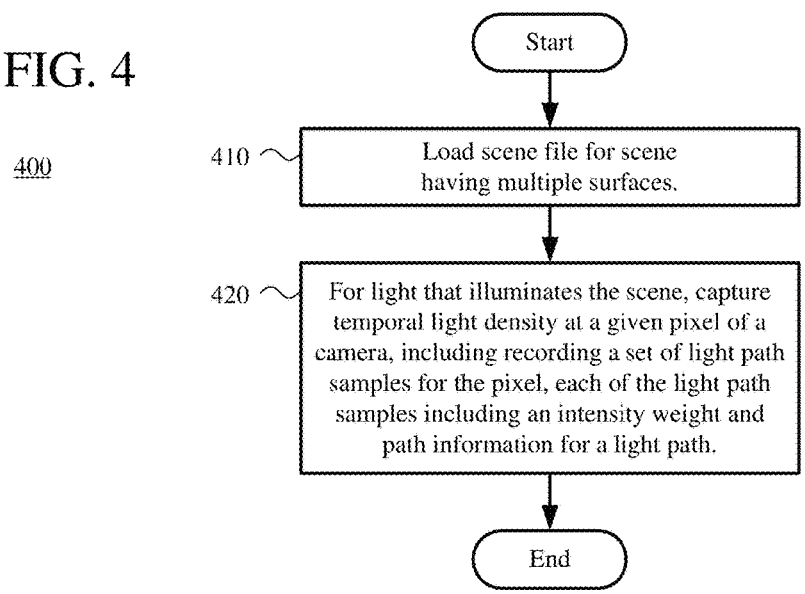
FIG. 4 is a flowchart illustrating a generalized technique for simulating multipath light phenomena.

FIG. 4 shows a generalized technique (400) for simulating multipath light phenomena. A graphics tool loads (410) a scene file for a scene having multiple surfaces. For example, the graphics tool loads a scene file from a buffer. The scene can include one or more 2D objects and/or one or more 3D objects, whose geometry and texture are specified in the scene file. The scene file can also specify lighting and shading effects for the scene.

For light that illuminates the scene, the graphics tool captures (420) temporal light density at a given pixel of a camera. For example, a light pulse introduces light paths in the scene, which are reflected by surfaces within the scene. In at least some cases, light travelling along light paths reaches the camera (e.g., a virtual camera (light sensor)), which measures how much light reaches different points of the virtual camera at different times. The graphics tool records a set of multiple light path samples for the given pixel. Each of the light path samples for the pixel includes an intensity weight for a light path and path information for the light path. For example, the path information includes a count of straight path segments for the light path and a duration or distance of the light path. (The duration of the light path (in time) and distance of the light path (e.g., in centimeters, meters, etc.) are equivalent measures—the distance of the light path equals the duration of the light path times the speed of light. As such, either duration of the light path or distance of the light path can be stored as part of the path information for the light path.) Thus, for the given pixel, the multiple light path samples organize intensity weights for different light paths over time. Alternatively, the path information includes other and/or additional information.

The light that illuminates the scene can include one or more light pulses from a light emitter that actively illuminate that scene. The light that illuminates the scene can also include ambient light. The details of the capture processing depend on implementation. For example, for each of multiple light path samples for a given pixel, the graphics tool calculates the intensity weight for a light path based on a product of: (a) output of a function representing a light emitter; (b) a scaling factor representing throughput of a differential beam between the light emitter and one of the multiple surfaces; (c) for each given surface of zero or more of multiple surfaces, a product of: (1) output of a bidirectional scattering distribution function indicating scattering of light, at the given surface, from an incoming ray towards another surface of the multiple surfaces or towards a light sensor; and (2) a scaling factor representing throughput of a differential beam between the given surface and the other surface or light sensor; and (d) output of a function representing sensitivity of the light sensor. Additional details about capture operations in variation of the Metropolis Light Transport ("MLT") algorithm are provided below. Alternatively, the graphics tool uses another approach for the capture (420) of temporal light density.

The graphics tool can apply various techniques to reduce variance among light path samples. For example, the graphics tool splits a set of multiple light path samples for a given pixel into multiple subsets depending on count of straight path segments. Suppose the multiple subsets include first and second subsets. The count of straight path segments is two for any light path sample in the first subset, and the count of straight path segments is greater than two for any light path sample in the second subset. Additional details about approaches that use "stratification" to reduce variance are provided below. Alternatively, the graphics tool splits a set of multiple light path samples into more subsets and/or uses different criteria for splitting.

The light path samples produced when capturing (420) temporal light density can consume a significant amount of memory or storage. The graphics tool can apply various techniques to reduce the memory/storage cost of light path samples. For example, the graphics tool uses priority sampling to manage the set of light path samples for a given pixel. For priority sampling, the graphics tool maintains up to a threshold count of light path samples for the pixel. After reaching the threshold count, when processing a new light path sample for the pixel, the graphics tools either (a) adjusts the intensity weight for one of the maintained light path samples, (b) replaces one of the maintained light path samples with the new light path sample, or (c) drops the new light path sample. Additional details about approaches that use "priority sampling" to reduce the memory/storage cost for light path samples are provided below.

After capture (420), a response vector can be generated using the light path samples. For example, a sample of the response vector is generated using, for each of multiple light path samples for a given pixel, the intensity weight for its light path scaled by an expected response from a point at a distance for the light path. The generating the sample of the response vector can also incorporate, as an offset, a measure of ambient light.

After capturing (420) the temporal light density for the given pixel, the graphics tool can capture temporal light density for one or more other pixels from the same perspective for the same scene, from different perspectives of the same scene, or for another scene.

C. Example of TOF Simulation of Multipath Light Effects with MLT

In computer graphics, physically-accurate renderers are a mature technology. A typical rendering tool supports integration of paths of light at each pixel of a rendered image, based on modeling of physical light scattering and light transport simulation, thereby producing a highly-realistic rendered image. For example, a rendering tool can use the Metropolis Light Transport ("MLT") algorithm to render the intensity of a pixel by approximating an integral over light paths connecting light sources, to surfaces, to the pixel.

Assuming a geometric light model where light travels in straight lines and only interacts with surfaces, the measured light intensity at a pixel in a static scene without active illumination can be formulated as a path integral. This integral accumulates the intensity from light paths $x_0, x_1 \ldots x_{k+1}$ that start in a point $x_0$ on an emitting surface (light source) and end in a point $x_{k+1}$ on the pixel's sensor surface (virtual camera). The intermediate nodes of this path $x_1 \ldots x_k$ are surfaces in the scene. The integral ("basic path integral formulation") can be formulated as:

$$\sum_{k=0}^{\infty} \int_{M^{k+1}} L_e(x_0 \to x_1) G(x_0 \leftrightarrow x_1) \prod_{i=1}^{k} (f(x_{i-1} \to x_i \to x_{i+1}) G(x_i \leftrightarrow x_{i+1}))$$

$$L_s(x_k \to x_{k+1}) dA(x_0) \ldots dA(x_{k+1}),$$

where the terms in the integral are defined as follows. M is the set of all surfaces in the scene, including emitters (light sources) and the camera sensor. A is the area measure on M. The function $L_e(x_0 \to x_1)$ is a function representing emitters. It is proportional to the light that is emitted from point $x_0$ in the direction of $x_1$. The function $L_e(x_0 \to x_1)$ takes only non-zero values if $x_0$ is on emitter surfaces. The function $L_s(x_k \to x_{k+1})$ is the equivalent of $L_e$ for the sensor. $L_s$ specifies how sensitive the sensor is for photons arriving at $x_{k+1}$ from the direction of $x_k$. The function $f(x_{i-1} \to x_i \to x_{i+1})$ is a bidirectional scattering distribution function ("BSDF")

describing how much light (of an incoming ray from the direction of $x_{i-1}$) is scattered at surface point $x_i$ in direction $x_{i+1}$. Finally, the function $$G(x_i \leftrightarrow x_{i+1}) = V(x_i \leftrightarrow x_{i+1}) \frac{|\cos\phi_i \cos\phi_{i+1}|}{\|x_{i+1} - x_i\|^2}$$

represents the throughput of a differential beam between $dA(x_i)$ and $dA(x_{i+1})$, where $V(x_i \leftrightarrow x_{i+1})$ is an indicator function for mutual visibility of $x_i$ and $x_{i+1}$. This mean V is zero if the direct path between the two points is blocked; otherwise, V is 1. The variables $\phi_i$ and $\phi_{i+1}$ denote the angles between the beam and the surface normals at $x_i$ and $x_{i+1}$, respectively.

The observed response $R_{active}$ in a specific pixel of a TOF camera from an emitted light pulse can be modelled by extending the basic path integral formulation:

$$R_{active} = \int \sum_{k=0}^{\infty} \int_{M^{k+1}} P(u) L_e(x_0 \to x_1)$$
$$G(x_0 \leftrightarrow x_1) \sum_{i=1}^{k} (f(x_{i-1} \to x_i \to x_{i+1}) G(x_i \leftrightarrow x_{i+1}))$$
$$L_s(x_k \to x_{k+1}) S_j(u + t_l) dA(x_0) \dots dA(x_{k+1}) du$$

where the terms of this first modified path integral formulation are the same as the basic path integral formulation, except as follows. The expression is integrated over time u, and it includes two additional functions. The function P(u) represents the emitted pulse, and the function $S_j(u+t_l)$ is a shutter function, which provides a gain function related to an exposure profile. Section IV.A includes additional explanation of the pulse function P(u) and shutter function $S_j(u+t_l)$. The total path length of the light path is $l = \Sigma_i \|x_{i+1} - x_i\|$. The time delay $t_l$ of the emitted light arriving at the sensor along the light path is the total path length l times the speed of light c: $t_l = c \cdot l$. From the first modified path integral formulation, the terms involving time can be grouped together as follows.

$$\int P(u) S_j(u + t_l) du = \frac{C_j(t_l)}{d(t_l)}$$

which only depends on the time delay $t_l$ corresponding to total path length. The function $C_j(t_l)$ is a curve representing the expected response from a point at a distance l (which is equivalent to time $t_l$), and the term $d(t_l)$ represents the decay of light due to distance:

$$d(t) = \frac{1}{t^2}.$$

Thus, the term $$\frac{c_j(t_l)}{d(t_l)}$$

corresponds to the curve $C_j$ without the decay of light $d(t_l)$ due to distance l. (The decay of light is already accounted for in the G terms of the first modified path integral formulation.) The measured response is then:

$$R_{active} = \sum_{k=0}^{\infty} \int_{M^{k+1}} \frac{C_j(t_l)}{d(t_l)} L_e(x_0 \to x_1) G(x_0 \leftrightarrow x_1) \sum_{i=1}^{k} (f(x_{i-1} \to x_i \to x_{i+1})$$
$$G(x_i \leftrightarrow x_{i+1})) L_s(x_k \to x_{k+1}) dA(x_0) \dots dA(x_{k+1})$$

where the terms of this second modified path integral formulation are the same as the basic path integral formulation, with the addition of the term $C_j(t_l)/d(t_l)$.

In some example implementations, the MLT algorithm of a rendering tool (example of a graphics tool) is modified to obtain path information. For a light path, the rendering tool determines the total light path length (or duration) and the number of segments of the light path. For example, for a pixel, the rendering tool records a weighted set of light path samples $\{(w_i, L_i, t_i)\}$, for $i=1, \dots, N$, calculated at points along the basic path integral formulation. The value of N depends on implementation. For example, N=4096, 8192, 16384, or some other count of light path samples. For a light path, the light path sample can include the intensity weight $w_i \geq 0$, the number of straight path segments $L_i$, and the time $t_i$ corresponding to total length of the path. (As explained, the distance or length of a light path is equivalent to a duration of the light path times the speed of light. As used herein, the time $t_i$ for a light path is sometimes referred to as the length, distance or duration of the light path.) The segment count can be used to distinguish direct responses ($L_i = 2$, emitter-to-surface and surface-to-camera) from multipath responses ($L_i > 2$). The rendering tool can record a weighted set of light path samples for each of the pixels of a rendered image, or for each of a subset of the pixel of the rendered image.

After rendering, the weights $w_i$ and times $t_i$ (path lengths) from the light path samples of the pixels can be used to generate samples of a response vector $R_{active}$. The response vector $R_{active}$ is the observed response at the virtual camera, accounting for the pulse function and shutter function (in the term $C_j(t_l)/d(t_l)$).

$$R_{active} = \sum_{i=1}^{N} \frac{w_i}{d(t_i)} C_j(t_i).$$

Considering expected response curves $C_1, C_2, \dots$, and adding a constant $\tau$ (representing ambient light without active illumination) scaled by a factor $\vec{A}$ that represents the shutter function, realistic estimates of a mean response vector $\vec{\mu}$ can be obtained.

$$\vec{\mu} = \tau \vec{A} + \sum_{i=1}^{N} \frac{w_i}{d(t_i)} \vec{C}(t_i).$$

The sum in the second term approximates the TOF integral $\int_{R_t} \vec{C}(t) d\gamma(t)$, where $\gamma$ is an intensity measure over time. The division by $d(t_i)$ is due to both $w_i$ and $\vec{C}$ containing the distance decay function $d(t)$. From $\vec{\mu}$, sensor noise can be simulated.

D. Reducing Variance and Memory/Storage Cost

Light path samples will have some amount of variance. For example, light path samples recorded using a variation of the MLT algorithm will have Monte Carlo variance. To improve the reliability of estimating temporal light density for pixels, a graphics tool can use "stratification" to reduce variance. A graphics tool can also use "priority sampling" to reduce variance and control the memory/storage cost of recording light path samples. (Compared to conventional rendering that produces a single light intensity value per pixel of a rendered image, capturing a set of light path samples per pixel has a much higher memory cost/storage cost.)

Stratification is a variance reduction technique based on prior knowledge of sub-populations of a population, where the sub-populations have lower within-population variation than the whole population. Stratification works by breaking up an estimation problem into one estimation problem per sub-population, then combining the individual estimates into one joint estimate. This reduces the variance of the joint estimate, compared to processing all sub-populations as a single population, with sampling and estimating from the single population.

When estimating temporal light density, the starting point for stratification is a stream of weighted samples $(w_i, L_i, t_i)$ that is generated for a pixel. The graphics tool stratifies (splits, separates) the incoming stream of samples into two subsets. The first subset is the set of light path samples for which $L_i=2$ (so-called "direct response" light path samples). The second subset is the set of samples for which $L_i>2$ (so-called "multipath response" light path samples). The graphics tool can keep the same number of light path samples for each subset (e.g., using priority sampling to maintain N light path samples, when using priority sampling for each subset separately), or the graphics tool can keep different numbers of light path samples in the different subsets.

A graphics tool may record 100 k, 200 k, or more light path samples per pixel. For a large image, the sets of light path samples $(w_i, L_i, t_i)$ for the respective pixels of the image can require tens of gigabytes of storage. Typically, many of the light path samples contain partially redundant information, so storing all of them is wasteful in terms of storage. One approach to thinning samples is to keep every $3^{rd}$ sample, every $5^{th}$ sample, every $10^{th}$ sample, or some other selected fraction of the samples. Another approach is to keep randomly selected samples. While such approaches may work when samples are unweighted, they can discard important samples with high weights when applied to weighted samples. This can result in high variance among the weighted samples that are kept.

To obtain low-variance estimates from few light path samples, a graphics tool can use priority sampling. Intuitively, priority sampling generalizes random sampling to the case of weighted samples. For priority sampling, the graphics tool processes an input sample stream one light path sample at a time, keeping up to a fixed number N of light path samples with adjusted weights. For example, N=4096, 8192, 16384, or some other count of light path samples. The weights can be adjusted such that the estimate of any subset sum is unbiased, and such that the variance of weight subset sums is almost optimal uniformly over the possible subsets. When stratification is used, the graphics tool can use priority sampling to thin sample streams for each subset (e.g., for one subset of light path samples that each have two light path segments, and for another subset of light path samples that each have more than two light path segments). The kept light path samples having adjusted weights are recorded and, after capture of temporal light density is finished, can be output. The kept light path samples having adjusted weights are representative of the overall set of light path samples, but typically have lower variance.

Figure 5:
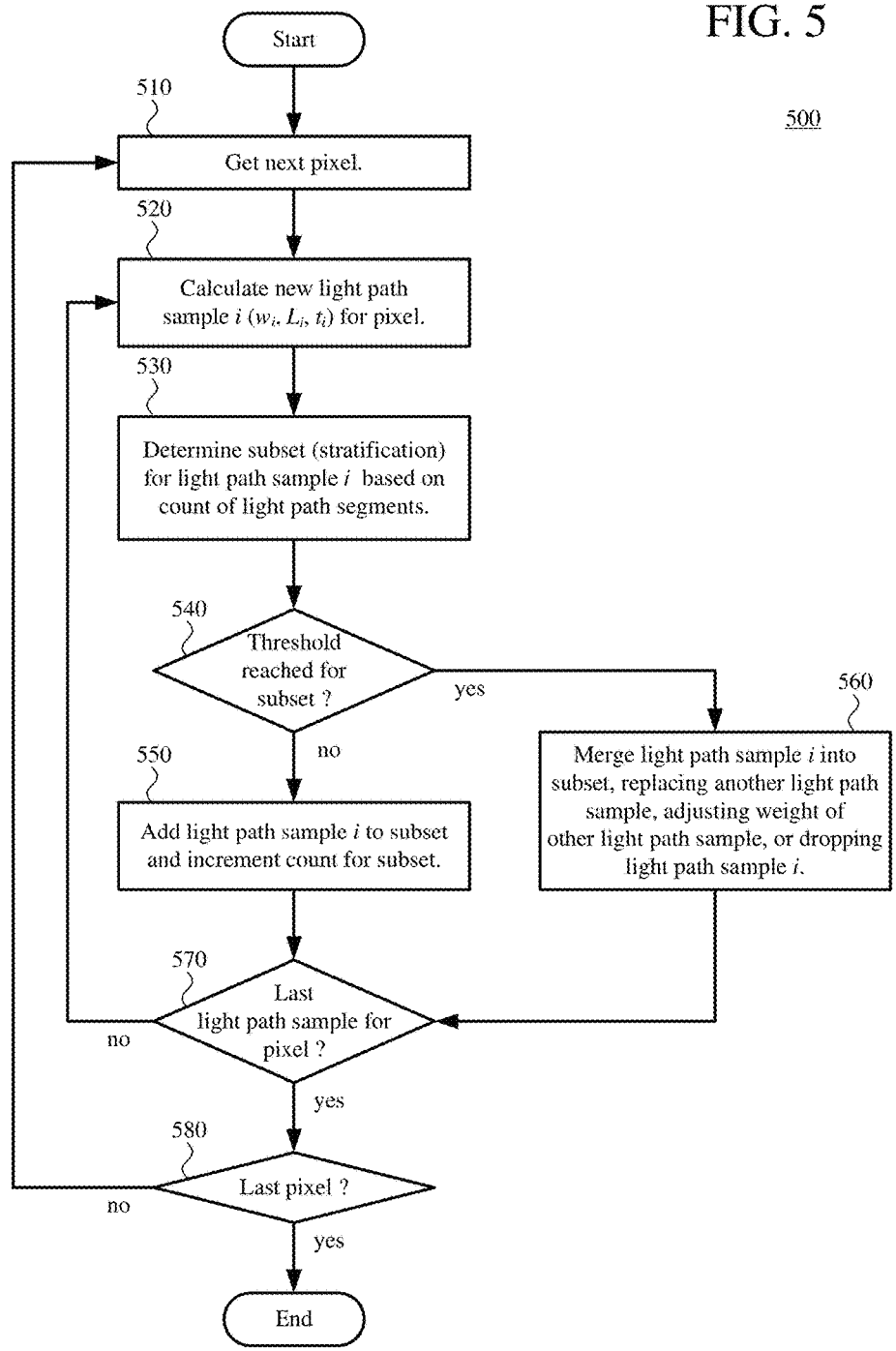
FIG. 5 is a flowchart illustrating an example technique for processing light path samples using stratification and priority sampling.

FIG. 5 shows an example technique for processing light path samples using stratification and priority sampling. A graphics tool gets (510) the next pixel. This next pixel is now the current pixel. The graphics tool also initializes counts of light path samples for the current pixel to zero (not shown in FIG. 5).

For the current pixel, the graphics tool calculates (520) a new light path sample i, including $(w_i, L_i, t_i)$ values. For stratification, the graphics tool determines (530) a subset for light path sample i based on the count of light path segments $L_i$ for light path sample i. For example, the graphics tool determines that light path sample i belongs in a first subset if $L_i=2$, and the graphics tool determines that light path sample i belongs in a second subset if $L_i>2$. Thus, the graphics tool separates "direct response" light path samples from "multipath response" light path samples.

Next, for priority sampling, the graphics tool checks (540) whether a threshold N of light path samples for the current pixel has been reached for the subset that was determined for light path sample i. The threshold N depends on implementation. For example, N=4096, 8192, 16384, or some other count of light path samples. If the threshold N has not been reached, the graphics tool adds (550) light path sample i to the subset ("keeps" light path sample i) and increments the count for the subset. On the other hand, if the threshold N has been reached, the graphics tool merges (560) light path sample i into the subset. For example, the graphics tool replaces another light path sample with light path sample i, or the graphics tool adjusts the weight of another light path sample based on light path sample i (e.g., increasing the weight of a light path sample having the same count of light path segments and a similar total time), or the graphics tool simply drops light path sample i.

The graphics tool checks (570) whether light path sample i is the last light path sample for the current pixel. If not, the graphics tool continues by calculating (520) a next light path sample i for the current pixel. Otherwise (light path sample i is the last light path sample for the current pixel), the graphics tool checks (580) whether the current pixel is the last pixel to process. If not, the graphics tool continues by getting (510) the next pixel. Otherwise (current pixel is last pixel), the graphics tool finishes.

E. Results

FIG. 6a shows a synthetic scene (601) created with a scene editing tool. The scene (601) includes several objects having different surface geometry and texture. In particular, FIG. 6a is a rendered image of the scene (601). FIG. 6b is a map of corresponding values of ground truth depth (602) for the rendered image of the scene (601). That is, FIG. 6b shows the actual depth values for pixels of the rendered image of FIG. 6a. Pixels of the rendered image represent points from 100 cm to 500 cm away from the virtual camera.

FIG. 6c is a map (603) of multipath ratios for pixels of the rendered image, where a multipath ratio for a pixel is a normalized measure of the percentage of light intensity integrated from multipath contributions, compared to light intensity integrated from direct light path contributions. The multipath ratio has a value between 0.0 and 1.0. If the multipath ratio is 0.0 for a pixel, the light path samples recorded for that pixel include no light path samples with more than two light path segments. If the multipath ratio is 1.0 for a pixel, the light path samples recorded for that pixel include light path samples with very significant multipath contributions. As shown in FIG. 6c, pixels at corners or edges between two surfaces often have significant multipath contributions.

For three pixels in the map (603) of multipath ratios (the pixels marked A, B, and C), FIG. 6d shows normalized light densities at different total lengths. The three pixels A, B, and C have different amounts of multipath contribution, as shown in the histograms in FIG. 6d. For each of pixels A, B and C, a histogram in FIG. 6d shows the distribution of distances traveled by the photons integrated at the pixel. The distribution is weighted to account for both distances and reflectivity of materials along light paths. For light that has traveled along direct response light paths (having two light path segments), the distribution of distances is shown in dark gray, and is typically closely clustered at the actual depth for the pixel. For light that has traveled along multipath response light paths (having more than two light path segments), the distribution of distances is shown in lighter gray. Typically, any significant multipath component for a pixel follows the direct path component for the pixel.

For example, as shown in the left histogram of FIG. 6d, pixel A (for a point on the table in the scene (601)) has little or no multipath component. As shown in the middle histogram of FIG. 6d, due to inter-reflections within the scene (601), pixel B (for a point near the edge between the far wall and floor of the scene (601)) has significant multipath components with total length in the range of 30-50 cm longer than the direct path component. As shown in the right histogram of FIG. 6d, due to mirror-like inter-reflections in part of the scene (601), pixel C (for a point on the left wall of the scene (601)) has a strong narrow multipath contribution that follows the direct path component.

IV. Exposure Profiles

In a pulsed TOF system, an exposure profile for a camera provides a gain value (so-called exposure gain) at different times (alternatively, distances), typically characterizing the shutter behavior of the camera. The exposure profile may be flexibly parameterized by linear basis functions, allowing for calibration or other adjustments to the exposure profile. A calibration tool can make one or more exposure profiles more robust to multipath light effects by adjusting the exposure profile(s) depending on differences between ground truth depths for a scene (relative to a camera) and inferred depths for the scene (relative to the camera). For a given pixel, one of the inferred depths can be based on light path samples for the given pixel (recorded as described above) and exposure profile(s).

A. Exposure Profiles, Generally

Suppose that a specific pixel captures an image of a point at a certain distance from a TOF camera, and that t is the time it takes light to travel twice this distance. A reflected signal is integrated at the pixel using a gain determined by a shutter signal S(·), which is an example of an exposure profile. If P(·) is the light pulse emitted from a light source collocated with the TOF camera, the reflected pulse arriving after time t is P(u−t). The observed response $R_{active}$ at the pixel due to the reflected light pulse is:

$$R_{active} = \int S(u)\rho P(u-t)d(t)du,$$

where ρ denotes the effective reflectivity (or albedo) of the imaged point. (The quantity ρ accounts for the effects of foreshortening, and thus represents effective reflectivity/albedo.) The term d(t) denotes decay of the reflected pulse due to distance:

$$d(t) = \frac{1}{t^2}.$$

Thus, the reflected pulse is downscaled by a factor of d(t), and the quantity ρP(u−t)d(t) is integrated with an exposure-determined gain S(·).

The actual observed response may also depend on ambient illumination. The term λ denotes ambient light level falling on an imaged point. The reflected ambient light level is ρλ. For the sake of simplicity, this level of ambient light is assumed to be constant during the integration period. The observed response at the pixel due to ambient light is $R_{ambient} = \int S(u)\rho\lambda du$. The actual observed response R at the pixel is the sum of the response due to active illumination and response due to ambient light:

$$R = \int S(u)(\rho P(u-t)d(t)+\rho\lambda)du.$$

This equation specifies the relationship between unknown imaging conditions depth (t) (equivalent to a time), albedo (ρ), and ambient light level (λ) and the observed response R at the pixel when using the exposure profile S(·).

A TOF system can include a camera characterized by different exposure profiles, which are essentially concurrent or interleaved for the camera. Suppose the TOF system uses n different exposure profiles $S_1(·), S_2(·), \ldots, S_n(·)$. The TOF system can obtain n observations $R_1, \ldots, R_n$ at a given pixel for an observed response vector $\vec{R}$:

$$\vec{R} = \begin{bmatrix} R_1 \\ \vdots \\ R_n \end{bmatrix} = \rho \begin{bmatrix} \int S_1(u)P(u-t)d(t)du \\ \vdots \\ \int S_n(u)P(u-t)d(t)du \end{bmatrix} + \rho\lambda \begin{bmatrix} \int S_1(u)du \\ \vdots \\ \int S_n(u)du \end{bmatrix} = \rho\vec{C}(t) + \rho\lambda\vec{A}.$$

In this equation ("basic imaging formulation"), $\vec{C}(t)$ is the expected response from a point at a distance equivalent to time t, assuming unit reflectivity and no ambient light. The response $\vec{C}(t)$ is scaled by the reflectivity ρ. The scaled response $\rho\vec{C}(t)$ is shifted in the ambient light direction $\vec{A}$, with the magnitude of the shift being the product of the reflectivity ρ and ambient light level λ. $\vec{C}(·)$ and $\vec{A}$ can be determined by illumination and exposure signals in a camera calibration process.

FIG. 7a shows response curves (700) for four example exposure profiles, as a function of depth (time) t. The four curves denote the specific responses of four exposure profiles $S_1(·), \ldots, S_4(·)$, that is $C_i(t)=\int S_i(u)P(u-t)d(t)du$. As depth (distance) grows, the responses change according to the response curve $\vec{C}(·)$ for the respective exposure profiles. FIG. 7b shows delay-compensated responses for the same four example exposure profiles (of FIG. 7a), in which $\vec{C}(t)/d(t)=t^2\vec{C}(t)$ is plotted as a function of depth (time) t, which facilitates visualization of the behavior of the responses.

For a given pixel, the values of the observed response vector $\vec{R}$ can be used to infer a depth for the point that is imaged at the pixel. For example, for the response curves shown in FIGS. 7a and 7b, consider what values of the response vector $\vec{R}$ are expected at t=150 cm. The value for the first exposure profile should be high, the values for the second and fourth exposure profiles should be lower than the value for the first exposure profile, and approximately equal, and the value for the third exposure profile should be lowest. In contrast, at t=190 cm, the values of $\vec{R}$ for the first and second exposure profiles should be approximately equal, and higher than the values of $\vec{R}$ for the third and fourth exposure profiles. So long as $\vec{C}(\cdot)$ is suitably designed, depth values may be accurately inferred using observed responses.

B. Adjusting Exposure Profiles

Designing a suitable response curve $\vec{C}$ and related vector $\vec{A}$ for use in the basic imaging formulation (see above) can help improve the accuracy of inferred imaging conditions. The response curve $\vec{C}$ is the integral of the illumination pulse P with the exposure profile S. In example implementations of TOF systems, a laser diode and driver produce an illumination pulse P, and the design of the laser diode and drive is fixed or has a very limited number of options (e.g., narrow pulse or wide pulse). The exposure gain S, however, has a flexible design space parameterized by a linear basis functions. Thus, response curves $\vec{C}$ can be designed to capture information relevant to inferring unknown imaging conditions of interest.

In a TOF system, a camera is able to use basic exposure gain profiles in the form of a boxcar function. FIG. 8 shows the attributes of a boxcar function (800) representing a basic gain profile. The basic gain profile has two parameters: a delay $\delta$ and a width wd. Each possible pair $j=(\delta,wd)$ specifies a possible gain profile $B_j$ from a fixed, discrete set of choices J. Typically, the set J contains several hundred possible combinations. The basis function $Q_j$ can be modeled as the convolution of $B_j$ with the pulse:

$$Q_j(t) = \int B_j(u)(P(u-t)d(t)du.$$

The basis response curves can be represented as vectors $Q_j \in \mathbb{R}^T$, for a time discretization with T values. By stacking the m=|J| vectors horizontally, the matrix $Q_j \in \mathbb{R}^{T \times m}$ contains the possible basis response curves. Each basis response curve can be represented as a non-negative linear combination of basis curves, that is $S(\cdot) = \Sigma z_j B_j(\cdot)$. The combined response curve is $C(\cdot) = \Sigma z_j Q_j(\cdot)$. To design not just one but n response curves (for $S_i(\cdot)$ for i=1, . . . , n), a matrix $Z \in \mathbb{R}^{m \times n}$ is used in C=QZ, where in $C \in \mathbb{R}^{T \times n}$ the k'th column contains the response for the k'th exposure sequence.

Statistical decision theory can be used to select Z to optimize the expected quality of depth inference. The quality of depth inference can be measured by means of a loss function which compares an estimated depth $\hat{t}$ with a known ground truth depth t to yield a quality score $l(\hat{t},t)$. One possible loss function is squared error: $l(\hat{t},t)=(\hat{t}-t)^2$. Alternatively, the loss function is $l_r(\hat{t}, t)=l(\hat{t},t)/t$ or another loss function.

For expectation, prior probability distributions p(t), p($\rho$), and p($\lambda$) over the unknown imaging conditions express expectations about the respective imaging conditions before evidence is taken into account. The prior probability distributions are typically uniform. The exposure profile design objective is:

$$\underset{Z}{\text{argmin}} f(Z) = \mathbb{E}_{t,\rho,\lambda} \mathbb{E}_{\vec{R} \sim P}(\vec{R} \mid t, \rho, \lambda, Z)^{[l(\hat{t}(\vec{R}),t)]},$$

subject to the constraints:

$$\sum_{j=1}^{m} \sum_{i=1}^{n} Z_{ji} \leq K_{shutter},$$

$$\sum_{j=1}^{m} 1_{\{Z_{ji}>0\}} \leq K_{sparsity}, \text{ for } i = 1, \ldots, n, \text{ and}$$

$$Z_{ji} \in \mathbb{N}, \text{ for } j = 1, \ldots, m, \text{ and } i = 1, \ldots, n,$$

where the notation $1_{\{pred\}}$ evaluates to one if the predicate is true and to zero otherwise. Each captured frame contains a fixed number $K_{shutter}$ of light pulses, each of which is associated with a basic exposure signal $B_j$. These are assigned in integer units. The total number of basis functions that can be used is constrained by $K_{sparsity}$ due to various shutter driver restrictions.

Solving the exposure profile design problem is a challenging combinatorial problem on three levels: first, computing $\hat{t}(\vec{R})$ has no closed form solution. Second, as a result, computing the expectations also has no closed form solution. Third, more than just merely evaluating it, the goal is to optimize the exposure profile design objective function over Z.

In some example implementations, an approximate solution works as follows. The exposure profile design objective function is approximated by a Monte Carlo evaluation for expectations (imaging conditions, and responses). For i=1, . . . , K, the values $t_i$, $\rho_i$, and $\lambda_i$ are drawn, then $\vec{R}_i$ is drawn, and then inference is performed to obtain $\hat{t}_i = \hat{t}(\vec{R}_i)$ and evaluate $l_i = l(\hat{t}_i, t_i)$. The exposure profile design objective is approximated as the empirical mean $$\frac{1}{K} \sum_{i=1}^{K} l_i.$$

For K=8192 samples this computation takes around one second.

For optimization of the exposure profile design objective, simulated annealing can be used on a custom-designed Markov chain which respects the structure constraints listed above for the exposure profile design objective. The exposure profile design objective can be abbreviated as: $f(Z) = \mathbb{E}_{t,\rho,\lambda} \mathbb{E}_{\vec{R} \sim P(\vec{R}|t,\rho,\lambda,Z)}[l(\hat{t}(\vec{R}),t)]$. An auxiliary Gibbs distribution is parameterized by a temperature T>0: $r(Z,T) \propto \exp$ $$\left(-\frac{1}{T} f(Z)\right).$$

A sequence of temperature parameters slowly decreases for a finite number of steps (that is, $T_0 > T_1 > \ldots > T_K$, starting from an initial temperature $T_0 = T_{start}$ and continuing down to a final temperature $T_K = T_{final}$). The smaller T gets, the more peaked the distribution $r(\cdot,T)$ becomes around the minimum of $f$. Given a Markov chain sampler on r, this approach converges to the global minimum of $f$.

To account for the sparsity constraints on Z, the Markov chain uses an augmented state space to avoid difficulties of asserting reversibility in the context of changing dimensionality. Z is decomposed into a binary matrix $B \in \{0,1\}^{m \times n}$ and a value matrix V∈ℝ$^{m×n}$ with $Z_{ji}=B_{ji}V_{ji}$. Weights can easily be set to zero by setting $B_{ji}=0$; or, weights may have non-zero values by setting $B_{ji}=1$. The sampler can be a reversible Metropolis-Hastings sampler that has the following six transition kernels (moves).

| Transition Kernel (Move) | Description |
|---|---|
| move mass | Choose two matrix entries $V_{ji}$, $V_{kl}$ randomly and move a uniformly sampled value from one entry to another such that their total value stays the same and both are still positive. This kernel is reversible with itself. |
| swap values | Choose two matrix entries $W_{ji}$, $W_{ji}$ randomly and swap their values V and binary indicator value B. This kernel is reversible with itself. |
| set a weight to zero | Choose a matrix entry with $B_{ji}=1$ randomly and set it to zero. This kernel is reversible with the following set-to-nonzero kernel. |
| set a weight to nonzero | Choose a matrix entry with $B_{ji}=0$ randomly and set its binary indicator value to one. This kernel is reversible with the previous set-to-zero kernel. |
| perturb weight value | Choose a matrix entry $V_{ji}=0$ randomly and rescale its value with a log-normal sampled factor. This kernel is reversible with itself. |
| scale all weight values | Rescale all values V with a log-normal sampled scalar. This kernel is reversible with itself. |

The kernels can be combined with probabilities that add up to 100%. For example, the kernels can be combined with the following probabilities: 20% for the move mass kernel; 20% for the swap values kernel; 10% for the set-to-zero kernel; 10% for the set-to-nonzero kernel; 30% for the perturb weight kernel; and 10% for the global scaling kernel.

The simulated annealing can use a geometric temperature schedule, with the temperature at iteration k being: $T_k = T_{start} \beta^k$, where $T_{start}$ and $T_{final}$ depend on implementation. For example, the initial temperature $T_{start}=20$, and the target temperature $T_{final}=0.01$, so that:

$$\beta = \exp\left(\frac{1}{K}[\log T_{final} - \log T_{final}]\right).$$

The count K of iterations also depends on implementation. For example, K=20,000 or K=100,000 iterations.

FIG. 9 shows response curves (900) for four exposure profiles after adjustments through an iterative process. The process uses simulated annealing to find response curves that minimize the exposure profile design objective (explained above), where the loss function is mean squared error between depths and estimated depths. The process starts at a completely closed exposure profile with zero gain, that is $Z_{ji}=0$ for all j, i. FIG. 9 shows delay-compensated response curves for the four exposure profiles after 20 k, 40 k, and 100 k iterations, as a function of depth.

C. Making Exposure Profiles Robust to Multipath Light Effects

In the exposure profile design objective explained above, two expectations are considered. The first expectation $\mathbb{E}_{t,\rho,\lambda}$ is over prior imaging conditions ("prior p"). The second expectation $\mathbb{E}_{\vec{R}\sim P(\vec{R}|t,\rho,\lambda,Z)}$ is over the assumed forward model P, as in $\vec{R}\sim P(\vec{R}|t,\rho,\lambda)$. This approach may minimize loss when responses come from a basic generative model, which does not include multipath light effects.

To design an exposure profile that will be more resistant to multipath light effects, loss is measured over responses that include multipath light effects. FIG. 10 shows a generalized technique (1000) for adjusting exposure profile(s) to make them more robust to multipath light effects.

To start, a calibration tool loads (1010) one or more exposure profiles. The calibration tool makes (1020) the exposure profile(s) more robust to multipath light effects by adjusting exposure profile(s) depending on differences between ground truth depths and inferred depths, which are based on values indicating temporal light densities for pixels.

For example, given one or more 3D scenes and realistic light paths simulated for the scene(s), the calibration tool samples responses from the scene(s). The scene(s) and simulated light paths provide a complex generative model Q, which accounts for reflectivity values and ambient lighting along the light paths when the response $\vec{R}$ is generated. The sampling from this complex model is $(\vec{R},t)\sim Q$. The response $\vec{R}$ generated using the complex generative model Q is "contaminated" by multipath light effects.

The basic generative model P depends on the factor Z through the relation $\mathbb{E}_{[\vec{R}|t,\rho,\lambda]}=\vec{\mu}(t,\rho,\lambda)=\rho\vec{C}(t)+\rho\lambda\vec{A}$. The complex generative model Q depends on the factor Z through the relation $$\vec{\mu} = \tau\vec{A} + \sum_{i=1}^{N} \frac{w_i}{d(t_i)} \vec{C}(t_i).$$

Both generative models can be combined. A fraction $\beta\in[0,1]$ of samples are from the assumed models prior p and P, and the remaining fraction $1-\beta$ of samples are from the physical simulation prior Q. The exposure profile design objective is $\beta \mathbb{E}_{t,\rho,\lambda\sim p} \mathbb{E}_{\vec{R}\sim P}[l(\hat{t}(\vec{R}),t] + (1-\beta) \mathbb{E}_{(\vec{R}|t)\sim Q}[l(\hat{t}(\vec{R}),t)]$, which accommodates rich priors over scenes as well as multipath light effects. The value of β depends on implementation. For example, β is 0.5. When β=1, the standard exposure profile design objective (using prior p and forward model P) is applied. Comparing multipath-resistant exposure profiles designed when β=0.5 and regular exposure profiles designed when β=1, using the multipath-resistant exposure profiles typically results in better performance (e.g., lower depth bias, lower error in depth estimates).

V. Inferring Imaging Conditions

Recovering the imaging conditions that have lead to a specific image—the inverse problem of imaging—is a long-standing goal of computer vision. In general, an inference tool estimates imaging conditions such as shape (or depth), ambient light levels, and albedo (reflectivity) based on an observed image or images. Imaging conditions can be inferred on a pixel-by-pixel basis for points represented in the observed image(s).

In some examples described in this section, an inference tool generates a training data set that relates example response vectors to example imaging conditions, using exposure profile(s), and then trains a regression tree using the training data set to obtain a predictor, which is configured to map an observed response vector to inferred imaging conditions. In some cases, this regression approach allows inference of imaging conditions to be performed in real time.

A. Pulsed TOF Cameras

The commercial success of depth cameras in recent years has enabled numerous computer vision applications such as human pose estimation and dense, online 3D reconstruction of an environment. Some depth cameras use triangulation, while other depth cameras estimate depth based on time-of-flight ("TOF"). Within the area of TOF cameras, some TOF cameras operate using phase-based TOF. A phase-based TOF camera generates a sinusoidal illumination signal and measures correlation of the reflected signal with a sinusoidal-profiled gain function of the same frequency, delayed by a phase shift. For a fixed frequency and phase shift, a recorded frame may not contain sufficient information to reconstruct depth. Therefore, phase-based TOF systems typically record a sequence of frames at multiple frequencies and multiple phase shifts, then process the combined set of frames to infer depth using so-called phase unwrapping algorithms.

On the other hand, a pulsed TOF camera (also called a gated TOF camera) generates a pulse of light then measures the reflected signal, where the amount of light received relates to the distance the light has traveled, which is different for different points in a scene. In contrast with the sine-like gain functions used in modulated TOF, a pulsed TOF camera can use a gain function chosen from a large space of possible gain functions.

Figure 11:
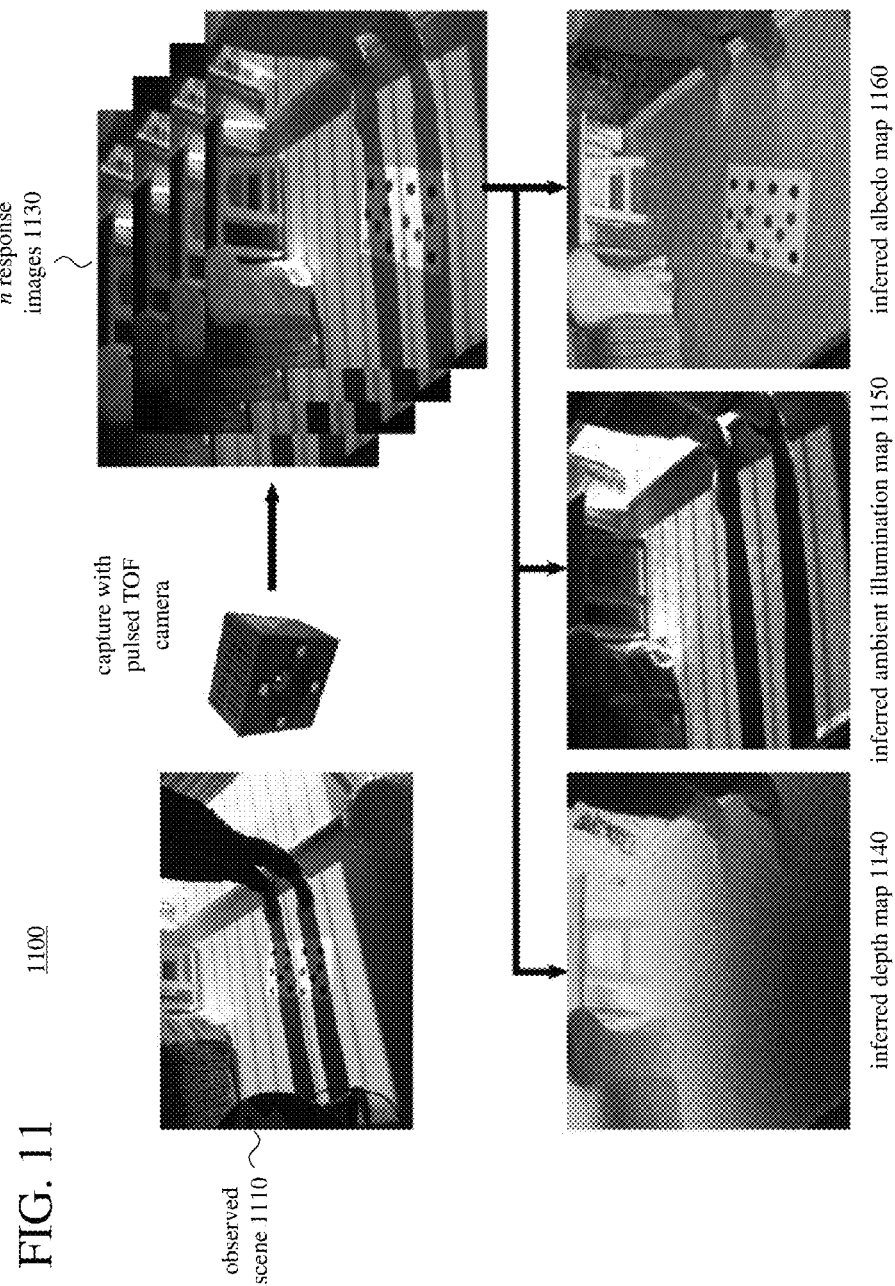
FIG. 11 is a diagram illustrating information flow and operations when inferring imaging conditions with a pulsed TOF camera.

FIG. 11 illustrates information flow (1100) and operations when inferring imaging conditions with a prototype pulsed TOF camera. A scene (1110) includes one or more 2D objects having surfaces and/or one or more 3D objects having surfaces. The scene (1110) is illuminated by one or ambient light sources. The scene (1110) is also actively illuminated by pulses of light from a pulsed TOF camera, which obtains n concurrently captured response images (1130). The n response images (1130) are captured using n different exposure profiles. For a given pixel, based on the values captured for the pixel in the n response images (1130), an inference tool can infer depth, ambient lighting conditions, and/or albedo for the point represented by the pixel. FIG. 11 shows an inferred depth map (1140) depicting depth values for the pixels of a rendered image of the scene. FIG. 11 also shows an inferred ambient illumination map (1150), which depicts ambient light levels for the pixels, and an inferred albedo map (1160), which depicts albedo values for the pixels.

A generative probabilistic model can relate unknown imaging conditions—shape (depth), illumination and albedo—to per-pixel camera observations. The probabilistic model can use, for example, Bayesian inference or maximum likelihood estimation to facilitate accurate inference of imaging conditions. For video, performing inference by such approaches in real time is infeasible under practical constraints on computation, however. Thus, in some example implementations, accurate but slow inference approaches are approximated using fast, non-parametric regression trees. The regression approach approximates the slower inference approaches, while satisfying tight constraints on computational resources and memory resources. The regression approach also decouples the specification of the inference model from the runtime application of the model, allowing for improvements in the model without requiring changes to the test-time implementation. In some cases, the regression approach permits separate inference of depth, ambient illumination, and effective albedo at every pixel of rendered images at 30 frames per second, which is a common frame rate for video (real time).

B. Probabilistic Models

The relation $\vec{R}=\rho\vec{C}(t)+\rho\lambda\vec{A}$ can be restated as a probabilistic model that relates the imaging conditions $(t,\rho,\lambda)$ to a probability distribution of responses $\vec{R}$. The probabilistic model gives the probability distribution of the observed $\vec{R}$ at a pixel, given the imaging conditions at the pixel. Conversely, one can infer the imaging conditions depth t, reflectivity $\rho$ and ambient light level $\lambda$ given an observation $\vec{R}$. Specifically, the responses $\vec{R}$ can be modeled as the probability of the responses $\vec{R}$ given t, $\rho$, $\lambda$, or $\vec{R} \sim P(\vec{R}|t,\rho,\lambda)$. $P(\vec{R}|t,\rho,\lambda)$ is a multivariate Gaussian distribution with mean vector defined as $\mathbb{E}[\vec{R}|t,\rho,\lambda]=\vec{\mu}(t,\rho,\lambda)=\rho\vec{C}(t)+\rho\lambda\vec{A}$, and with a diagonal covariance matrix:

$$\sum(\vec{\mu}) = \begin{pmatrix} \alpha\mu_1 + K & & \\ & \ddots & \\ & & \alpha\mu_n + K \end{pmatrix}$$

Here K is related to read noise, which is part of the system even when no light exists. The linear relationship between the magnitude of the response and its variance is due to shot noise. The noise may contain relevant information for depth inference and for predicting depth uncertainty.

There are several approaches for implementing the probabilistic model. In the following sections, the compound parameter vector $\vec{\phi}=[t,\rho,\lambda]^T$ represents unknown imaging conditions to be inferred. The response curve function $\vec{C}(t)$ appearing in the expression for mean photon response ($\mathbb{E}[\vec{R}|t,\rho,\lambda]=\vec{\mu}(t,\rho,\lambda)=\rho\vec{C}(t)+\rho\lambda\vec{A}$) can be obtained from calibrated measurements of an actual camera, and then approximated by Chebyshev polynomials of degree sixteen. Because the curves are smooth, the Chebyshev approximation is compact yet very accurate, and evaluation of $\underline{C}(t)$ also provides the derivatives $$\frac{\partial}{\partial t}\vec{C}(t)$$

and $$\frac{\partial}{\partial^2 t}\vec{C}(t)$$

for no additional computational cost.

1. Bayesian Inference

For Bayesian inference, certain prior probability distributions are assumed for depth, reflectivity and ambient light level, which are denoted $p(t)$, $p(\rho)$, and $p(\lambda)$. Independence between these factors is also assumed.

The following description focuses on inferring depth t. (Ambient light level $\lambda$ and albedo $\rho$ can be similarly derived, substituting $\lambda$ or $\rho$ for t in the following description.) For depth t, the Bayes rule gives the posterior distribution over the true unknown depth:

$$P(t|\vec{R}) \propto P(\vec{R}|t)p(t) = p(t)\iint P(\vec{R}|t,\rho,\lambda)p(\rho)p(\lambda)d\rho d\lambda$$

An inference tool can get the posterior density up to a normalization factor which may be extracted by integrating over every possible t. The posterior density is suitable input to higher level applications which use probabilistic models. For other applications, it may be sufficient to summarize this posterior distribution by a point estimate.

For example, the Bayes estimator can yield a point estimate. Assuming the squared loss function, the estimator is characterized as:

$$\hat{\phi}_{Bayes}(\vec{R}) := \underset{\vec{\phi}}{\operatorname{argmin}} \mathbb{E}_{\tilde{\phi} \sim P(\tilde{\phi}|\vec{R})}\left[\|\vec{\phi} - \tilde{\phi}\|_2^2\right],$$

where $\tilde{\phi}$ are the true but uncertain parameters. This decision problem has a closed form solution: namely the mean parameters under the marginal posterior distributions. Because the squared loss decomposes over parameters, so does the decision problem. For example, the Bayes estimator $\hat{t}_{Bayes}$ for depth is given by:

$$\hat{t}_{Bayes}(\vec{R}) = \mathbb{E}[t|\vec{R}] = \int tp(t|\vec{R})dt.$$

The marginal posterior distribution $p(t|\vec{R})$ can be written in terms of the joint distribution as $$p(t|\vec{R}) = \int p(\vec{\phi}|\vec{R})d\vec{\rho}d\lambda = \int \frac{(\vec{R}|\vec{\phi})p(\vec{\phi})}{p(\vec{R})}d\rho d\lambda$$

The Bayes estimator $\hat{t}_{Bayes}$ is therefore equal to:

$$\mathbb{E}[t|\vec{R}] = \frac{\int tp(\vec{\phi})p(\vec{R}|\vec{\phi})d\vec{\phi}}{\int p(\vec{\phi})p(\vec{R}|\vec{\phi})d\vec{\phi}}.$$

One way of computing the Bayes estimator is solving the integrals in the numerator and denominator for all parameters of interest (e.g., using a numerical quadrature method for vector-valued integrals over rectangular regions). Such an approach can be very slow, however, and it may have numerical issues that yield sub-optimal solutions.

An alternative approach to compute the Bayes estimator is a Monte Carlo approach using importance sampling. The posterior distributions of the single-path model are mostly dominated by a few important modes that often have symmetric shape. The posterior can therefore be approximated well by a mixture of Gaussians. Using importance sampling with a mixture of Gaussians proposal distribution can therefore yield fast convergence to the true Bayes estimator. The proposal distribution is a mixture of k Gaussians placed at the outputs of k local optima of the maximum a-posteriori ("MAP") problem (obtained as described below). The proposal distribution is:

$$q(\vec{\phi}) \propto \Sigma_{i=1}^k p(\vec{R}|\vec{\phi}^{(i)}) \mathcal{N}(\vec{\phi}|\vec{\phi}^{(i)}, H^{(i)}),$$

where k is the number of mixture components used and $\vec{\phi}^{(k)}$ are the locations of these mixtures. For the covariance matrices $H^{(k)}$, the inference tool can use the inverse Hessian of the negative log-posterior (as in a Laplace approximation). Due to the particular choice of twice differentiable priors, the Hessian of the log-posterior is always positive definite in local optima.

The inference tool generates samples $\vec{\eta}_1, \ldots, \vec{\eta}_m$ from q. The inference tool re-weights each sample by $$w_i = \frac{p(\vec{\eta}_i)}{q(\vec{\eta}_i)}$$

to account for errors in the approximation of the posterior by q. These samples are then used to obtain Monte Carlo estimates of the integrals in $$\mathbb{E}[t|\vec{R}] = \frac{\int tp(\vec{\phi})p(\vec{R}|\vec{\phi})d\vec{\phi}}{\int p(\vec{\phi})p(\vec{R}|\vec{\phi})d\vec{\phi}}$$

The effective sample size ("ESS") is the number of samples required to approximate the integrals:

$$\frac{\left(\sum_{i=1}^m w_i\right)^2}{\sum_{i=1}^m w_i^2}$$

The inference tool stops sampling as soon as the ESS exceeds a threshold, which depends on implementation. For example, the threshold is in the range of 50-200. In most cases this threshold is reached with a small number of actual samples.

Although the Monte Carlo approach using importance sampling is typically faster and more robust than the numerical quadrature approach, Bayes estimation is still a computationally-intensive process. When applied at every pixel in a rendered image, determining imaging conditions at real-time frame rates with low resources is not currently feasible. Another issue with Bayes estimation is that it requires the specification of prior probability distributions p(t), p(ρ), and p(λ). While using uniform prior probability distributions on depth and reflectivity seems reasonable, specifying the prior probability distribution on ambient light level is harder. For example, operating the camera in a dark room versus a sunlit room would require very different prior probability distributions for ambient light level. If the prior probability distribution that is used deviates too much from the actual situation, estimates of depth could be biased (that is, suffer from systematic errors).

2. Maximum Likelihood Inference

Alternatively, the inference tool uses maximum likelihood estimation ("MLE") to infer imaging conditions. Instead of considering the depth that accumulates the most probability over all reflectivity and ambient light explanations, the inference tool determines the combination of imaging conditions $(\hat{t}_{mle}, \hat{\rho}_{mle}, \hat{\lambda}_{mle})$ which has the highest probability of producing the observed response $\vec{R}$:

$$(\hat{t}_{mle}, \hat{\rho}_{mle}, \hat{\lambda}_{mle}) = \underset{t,\rho,\lambda}{\operatorname{argmax}} P(\vec{R}|t,\rho,\lambda)$$

This optimization problem is non-linear because $\vec{\mu}(\cdot)$ is non-linear, and because the noise model (see diagonal covariance matrix above) has a signal-dependent variance. With an iterative numerical optimization, determining imaging conditions at real-time frame rates with low resources is not currently feasible.

The standard MLEs are the imaging conditions $t,\rho,\lambda$ which minimize the negative log-likelihood:

$$\underset{\vec{\phi}}{\operatorname{argmin}} - \log P(\vec{R} \mid \vec{\phi}) = \underset{\vec{\phi}}{\operatorname{argmin}} \sum_{i=1}^{n} \left[ \frac{(R_i - \mu_i(\vec{\phi}))^2}{2(\alpha\mu_i(\vec{\phi}) + K)} + \frac{1}{2}\log(\alpha\mu_i(\vec{\phi}) + K) \right]$$

With Chebyshev polynomial approximation, derivatives can be computed with respect to $\vec{\phi}$ of the log-likelihood function, and the entire log-likelihood function becomes smooth and twice differentiable. Solving the three-dimensional minimization problem in this equation with standard quasi-Newton methods such as L-BFGS is possible but often yields unreasonable results if parameters are not constrained. For example, negative values of $\rho$ might have the lowest function value but are physically impossible. Another issue is that the response curves $\vec{C}$ are measured only within a reasonable range. Outside of this range, the Chebyshev approximations have arbitrary behavior which leads to implausible solutions. Thus, the range of parameters is constrained using log-barrier terms:

$$\underset{\vec{\phi}}{\operatorname{argmin}} \sum_{i=1}^{n} \left[ \frac{(R_i - \mu_i(\vec{\phi}))^2}{2(\alpha\mu_i(\vec{\phi}) + K)} + \frac{1}{2}\log(\alpha\mu_i(\vec{\phi}) + K) \right] + \sum_j b(\log(\phi_j - \phi_{j,min}) + \log(\phi_{j,max} - \phi_j)).$$

In this equation, the scalar $b=10^{-2}$ is a barrier coefficient. $\vec{\phi}_{min}$, $\vec{\phi}_{max}$ are the smallest and largest values of each parameter to be considered. The problem remains twice differentiable, and quasi-Newton methods can be applied for finding local minima reliably because any local optima has to occur within the relative interior of the rectangle described by $\vec{\phi}_{j,min}$ and $\vec{\phi}_{j,max}$. To find the global optimum, the quasi-Newton method can be restarted x times (e.g., ten times) with initialization sampled uniformly in the parameter ranges. For producing labeled training data, performing ten restarts is more than sufficient. Even during exposure profile optimization, experiments on various shutter designs have shown that, after ten restarts, in 97% of the cases the same global solution was found as with 100 restarts.

3. Maximum A-Posteriori ("MAP") Estimation

The MAP estimation process is similar to the MLE process, but also considers the prior probability distribution instead of only the likelihood distribution. A MAP estimate can be determined by minimizing the negative log posterior:

$$\underset{\vec{\phi}}{\operatorname{argmin}} - \log P(\vec{\phi} \mid \vec{R}) =$$

$$\underset{\vec{\phi}}{\operatorname{argmin}} \sum_{i=1}^{n} \left[ \frac{(R_i - \mu_i(\vec{\phi}))^2}{2(\alpha\mu_i(\vec{\phi}) + K)} + \frac{1}{2}\log(\alpha\mu_i(\vec{\phi}) + K) \right] - \log p(\vec{\phi})$$

Due to the particular choices of twice differentiable prior distributions, this problem can be solved with quasi-Newton methods. The log-barrier terms used for the MLE are now implicitly defined in the prior probability distribution. In fact, the constrained MLE in the previous section can be understood as a MAP estimate with an approximately uniform prior probability distribution on the ranges $\vec{\phi}_{min}$ to $\vec{\phi}_{max}$. An advantage of the MAP estimate is that when prior knowledge exists—for example, a strong belief with respect to ambient light intensity—then that prior knowledge may be incorporated. In contrast, MLE does not encode any preference for certain parameter values.

C. Regression Tree Approaches

Although MLE and Bayesian inference produce reliable depth estimates $\hat{t}_{MLE}$ and $\hat{t}_{Bayes}$, respectively, in both cases the computation of the estimate is computationally intensive and hence impractical for a real-time camera system. For real-time inference, an inference tool can instead use a regression tree approach. Using a regression tree approach can provide several advantages. Both $\hat{t}_{mle}$ and $\hat{t}_{Bayes}$ are smooth functions from the response space to depth and are simple to learn. The resulting regression tree has small performance requirements in terms of memory and computation.

Figure 12:
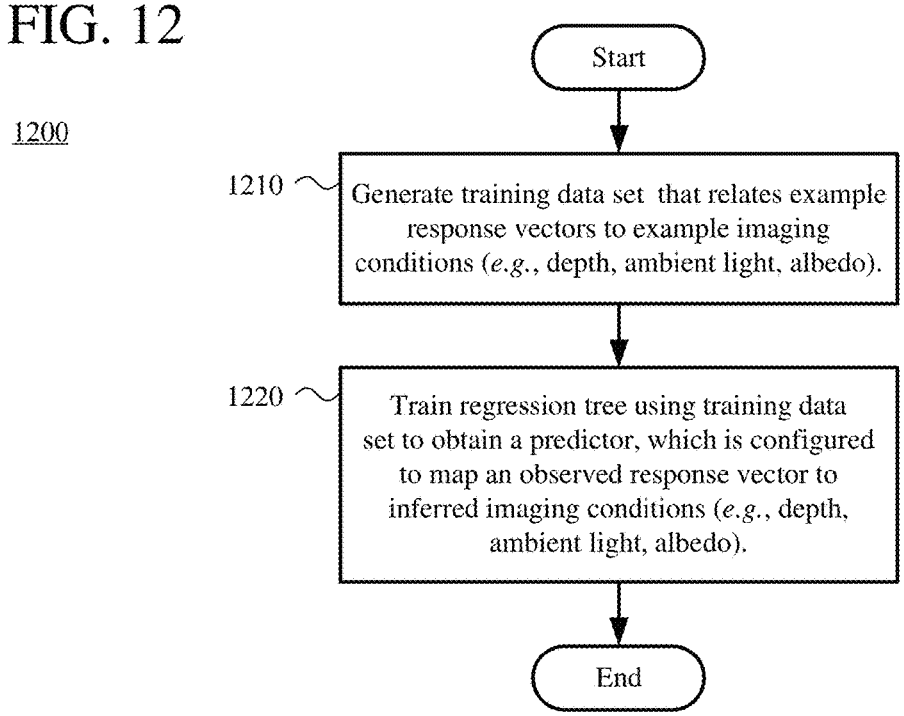
FIG. 12 is a flowchart illustrating a generalized technique for generating a predictor that maps response vectors to inferred imaging conditions.

FIG. 12 shows a generalized technique (1200) for generating a predictor that maps response vectors to inferred imaging conditions. An inference tool performs the technique (1200) in offline processing, producing a predictor that can be used to infer imaging conditions from observed response vectors.

To start, the inference tool generates (1210) a training data set that relates example response vectors to example imaging conditions (e.g., depth, ambient light, albedo). For example, in offline processing, the inference tool samples imaging conditions $(t_i, \rho_i, \lambda_i)$, from the prior probability distributions, and responses $\vec{R}_i$ from a probabilistic model $\vec{R} \sim P(\vec{R} \mid t, \rho, \lambda)$. The inference tool uses one of the slow inference methods (e.g., Bayes inference, MLE) to generate labeled training data $(\vec{R}_i, \hat{t}(\vec{R}_i))$.

Then, the inference tool trains (1220) a regression tree using the training data set to obtain a predictor. The predictor is configured to map an observed response vector to inferred imaging conditions (e.g., depth, ambient light, albedo). For example, the inference tool trains a regression tree/forest using the training data set $(\vec{R}_i, \hat{t}(\vec{R}_i))$ to obtain a predictor $\hat{t}_{RF}$. To learn the regression tree, the inference tool can use standard CART sum-of-variances criterion in a greedy depth-first manner. For the interior nodes of the tree, the inference tool can perform simple binary comparisons on the individual responses, $R_i \leq a$. At each leaf node b, the inference tool can store a linear regression model:

$$\hat{t}_b(\vec{R}) = \theta_b^T \cdot [1, R_1, \ldots, R_n, R_1^2, R_1R_2, \ldots, R_n^2]^T,$$

where quadratic expansion of the responses is used. The inference tool can then estimate the parameters $\theta_b$ of each leaf model using least squares on all training samples that reach this leaf.

Figure 13:
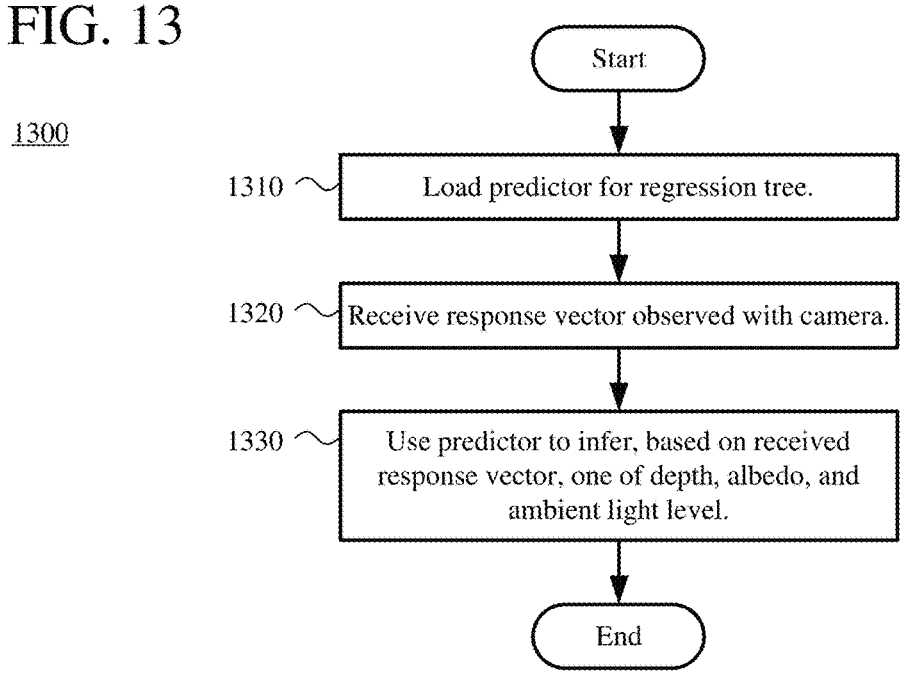
FIG. 13 is a flowchart illustrating a generalized technique for inferring imaging conditions using a predictor for a regression tree.

FIG. 13 shows a generalized technique (1300) for inferring imaging conditions using a predictor for a regression tree. An inference tool loads (1310) a predictor for a regression tree (e.g., a predictor determined according to the approach described with reference to FIG. 12). The inference tool also receives (1320) a response vector observed with a camera. The inference tool uses (1330) the predictor to infer, based on the received response vector, an imaging condition (e.g., depth, albedo, ambient light level). For example, given an observed response $\vec{R}$, the inference tool calculates the inferred depth $\hat{t}_{RF}(\vec{R})$.

The specification of a predictor for a regression tree using a probabilistic model (as explained with reference to FIG. 12) is decoupled from the runtime use of the predictor to infer imaging conditions (as explained with reference to FIG. 13). This decouples the runtime from future changes to the probabilistic model and inference procedures, which provides flexibility to handle unexpected or new phenomena.

For example, in a physical camera, due to various optical and semiconductor effects, the response curve $\vec{C}(\cdot)$, which characterizes a pixel's response to depth, varies between sensor elements. This variation tends to be smooth with the position of the pixel on the image sensor. As a result, instead of having a single curve $\vec{C}(\cdot)$, as described herein for the sake of simplicity, the response curve $\vec{C}(\cdot)$ can actually be a set of response curves $\vec{C}_{x,y}(\cdot)$, one for each pixel in the image. Using the regression tree framework, this issue can be addressed as follows. During training, instead of sampling responses from a single curve $\vec{C}(\cdot)$, the inference tool samples responses from multiple response curves corresponding to different parts of the image. To obtain the label $\hat{t}(\vec{R}_i)$, the inference tool uses slow inference with the actual, position-dependent curve from which $\vec{R}_i$ was sampled. The feature vector is augmented to include pixel position in addition to the response $\vec{R}$. The leaf model is extended, adding linear terms in pixel coordinates x and y. Then, the regression tree is trained as usual. During runtime, pixel position is added to the feature vector used to traverse the tree. This example shows the added benefit of a flexible regression mechanism in extending the probabilistic model to solve new problems.

Because of its non-parametric nature, the regression tree (or forest) can approach the quality of full inference (using a slower probabilistic model) if given sufficient training data and expressive power. A limiting factor in implementation, however, is constraints on available memory and computational resources. The memory requirements for a regression tree depend on the depth of the tree and the structure of the leaf predictor, which vary depending on implementation. Example depths include 8, 12, and 16. Example structures for the leaf predictor include linear polynomial and quadratic polynomial. For example, when a regression tree is used to infer depth, error will be introduced compared to the depth values inferred using a slower probabilistic model approach. The magnitude of the error depends on the tree structure (depth, structure for the leaf predictor). Typically, using a quadratic polynomial as the structure for the leaf predictor provides better estimation quality (lower error) than using a linear polynomial at the same depth. Increasing tree depth also provides better estimation quality (lower error). In some tests, using a tree with a depth of 16 provides estimation quality comparable to full inference using a slower probabilistic model.

Instead of or in addition to estimated depth, an inference tool can output several other quantities per pixel using trained regression trees. For example, the inference tool can produce estimated albedo values $\hat{\rho}$ and/or estimated ambient light levels $\hat{\lambda}$ using MLE:

$$\left(\hat{t}_{mle}, \hat{\rho}_{mle}, \hat{\lambda}_{mle}\right) = \underset{t,\rho,\lambda}{\operatorname{argmax}} P(\vec{R} \mid t, \rho, \lambda).$$

Or, the inference tool can produce estimates of depth uncertainty.

In certain applications of depth cameras to computer vision problems, estimated depth is used as part of a larger system. In such applications, it may be useful to know the uncertainty of the depth estimate. For example, in the area of surface reconstruction, uncertainty can be used to weight individual estimates and average them over time.

An inference tool can use the standard deviation or variance of depth as a measure of uncertainty. For example, for $\hat{t}_{Bayes}$ the inference tool uses the posterior distribution and directly computes $\hat{\sigma}_{Bayes}(\vec{R}) = \sqrt{V_{t \sim P(t|\vec{R})}[t]}$.

Or, as another example, for $\hat{t}_{MLE}$, an inference tool uses a first-order Taylor expansion of the gradient (with respect to imaging conditions) of the likelihood function in $$\left(\hat{t}_{mle}, \hat{\rho}_{mle}, \hat{\lambda}_{mle}\right) = \underset{t,\rho,\lambda}{\operatorname{argmax}} P(\vec{R} \mid t, \rho, \lambda)$$

to relate a perturbation $\Delta\vec{R}$ in the response to the resulting perturbation of the estimator $\hat{t}_{MLE}(\vec{R}+\Delta\vec{R})$. This analysis leads to the covariance matrix of the MLE and an approximation of the standard deviation, $\hat{\sigma}_{mle}(\vec{R}) = \sqrt{V[\hat{t}_{mle}]}$.

Tests have shown that the inference tool is able to accurately assess its own uncertainty in inferred depth values. Imaging conditions can affect the variance of depth estimates, however. In shadowed regions, the ratio between active illumination and ambient light is higher, and this generally leads to less uncertainty in depth estimates. On material with higher albedo (that is, more reflective material), the amount of reflected light is higher, and this also leads to less uncertainty in depth estimates (as compared with less reflective material, for which uncertainty in depth estimates tends to be higher). Thus, posterior depth uncertainty tends to be higher under stronger ambient light conditions or for lower albedo material. Also, the depth itself can affect the measure of uncertainty (e.g., increasing in magnitude as depth increases).

VI. Results

In some example implementations, an inference tool running on an Intel HD Graphics 4400 GPU evaluates a regression tree of depth 12 with full quadratic polynomials on a 200-by-300 pixel frame in 2.5 ms. This means the inference tool can run four trees (e.g., one for each of depth, illumination, albedo and standard deviation of depth) effectively at 100 fps.

For the inference tool, two sets of exposure profiles were designed based on two different prior probability distributions p(t) for depth. The first prior probability distribution focuses on larger ranges of depths and yields the first set of exposure profiles. The second prior probability distribution focuses on smaller ranges of depths and yields the second set of exposure profiles. Additional scene-specific prior probability distributions and task-specific prior probability distributions can be developed. Such prior probability distributions may be used to develop exposure profiles that improve performance in the presence of strong multipath light effects and ambient light.

In example implementations, the inferred albedo image is illumination-invariant and therefore does not contain shadows. For use in real-time shadow removal, the inferred albedo image can be provided as an illumination-invariant input to another computer vision tool. Conversely, in example implementations, an inference tool also produces an inferred illumination map (ambient light levels) that is invariant to albedo.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A system comprising:
   a buffer, implemented as part of memory of the system, configured to store a scene file for a scene having multiple surfaces; and
   a graphics tool, implemented using one or more processing units of the system, configured to infer depth, ambient lighting, and/or albedo conditions for points represented by pixels of a camera using pulsed time-of-flight simulation of multipath light effects in the scene, the graphics tool being configured to perform operations comprising:
   using one or more light pulses to illuminate the scene;
   capturing, for light that illuminates the scene from the one or more light pulses, temporal light density at a given pixel of the pixels of the camera; and
   reducing variance of light path samples for the given pixel.

2. The system of claim 1, wherein, for the given pixel, the temporal light density organizes intensity weights for different light paths in the temporal domain.

3. The system of claim 1, wherein the capturing the temporal light density at the given pixel includes recording the light path samples for the given pixel, each of the light path samples for the given pixel including:
   an intensity weight for a light path;
   a count of straight path segments for the light path; and
   a duration or distance of the light path.

4. The system of claim 1, wherein the reducing variance includes performing stratification that includes separating the light path samples for the given pixel into subsets depending on count of straight path segments, the subsets including a first subset and a second subset, wherein the count of straight path segments is two for any light path sample in the first subset, and wherein the count of straight path segments is greater than two for any light path sample in the second subset.

5. The system of claim 1, wherein the reducing variance includes using priority sampling to manage the light path samples for the given pixel.

6. The system of claim 1, wherein the graphics tool is further configured to:
   generate a sample of a response vector using, for each of the light path samples for the given pixel, an intensity weight for a light path scaled by an expected response from a point at a distance for the light path, offset by a measure of ambient light.

7. The system of claim 1, wherein the graphic tool is further configured to calibrate exposure profiles to reduce multipath light effects.

8. In a computer system that includes memory and one or more processing units, a method comprising:
   storing a scene file, at a buffer implemented as part of the memory of the computer system, for a scene having multiple surfaces; and
   with a graphics tool implemented using the one or more processing units of the computer system, using pulsed time-of-flight simulation of multipath light effects in the scene to infer depth, ambient lighting, and/or albedo conditions for points represented by pixels of a camera, including:
   using one or more light pulses to illuminate the scene;
   capturing, for light that illuminates the scene from the one or more light pulses, temporal light density at a given pixel of the pixels of the camera; and
   reducing variance of light path samples for the given pixel.

9. The method of claim 8, wherein, for the given pixel, the temporal light density organizes intensity weights for different light paths in the temporal domain.

10. The method of claim 8, wherein the capturing the temporal light density at the given pixel includes recording the light path samples for the given pixel, each of the light path samples for the given pixel including:
    an intensity weight for a light path;
    a count of straight path segments for the light path; and
    a duration or distance of the light path.

11. The method of claim 8, wherein the reducing variance includes performing stratification that includes separating the light path samples for the given pixel into subsets depending on count of straight path segments, the subsets including a first subset and a second subset, wherein the count of straight path segments is two for any light path sample in the first subset, and wherein the count of straight path segments is greater than two for any light path sample in the second subset.

12. The method of claim 8, wherein the reducing variance includes using priority sampling to manage the light path samples for the given pixel.

13. The method of claim 8, further comprising:
    generating a sample of a response vector using, for each of the light path samples for the given pixel, an intensity weight for a light path scaled by an expected response from a point at a distance for the light path, offset by a measure of ambient light.

14. The method of claim 8, further comprising:
    calibrating exposure profiles to reduce multipath light effects.

15. One or more computer-readable media storing computer-executable instructions for causing one or more processing units, when programmed thereby, to perform operations comprising:
    storing a scene file, at a buffer, for a scene having multiple surfaces; and
    using pulsed time-of-flight simulation of multipath light effects in the scene to infer depth, ambient lighting, and/or albedo conditions for points represented by pixels of a camera, including:
    using one or more light pulses to illuminate the scene;
    capturing, for light that illuminates the scene from the one or more light pulses, temporal light density at a given pixel of the pixels of the camera; and
    reducing variance of light path samples for the given pixel.

16. The one or more computer-readable media of claim 15, wherein the capturing the temporal light density includes recording the light path samples for the given pixel, each of the light path samples for the given pixel including:
- an intensity weight for a light path;
- a count of straight path segments for the light path; and
- a duration or distance of the light path.

17. The one or more computer-readable media of claim 15, wherein the reducing variance includes performing stratification that includes separating the light path samples for the given pixel into subsets depending on count of straight path segments, the subsets including a first subset and a second subset, wherein the count of straight path segments is two for any light path sample in the first subset, and wherein the count of straight path segments is greater than two for any light path sample in the second subset.

18. The one or more computer-readable media of claim 15, wherein the reducing variance includes using priority sampling to manage the light path samples for the given pixel.

19. The one or more computer-readable media of claim 15, wherein the operations further comprise:
- generating a sample of a response vector using, for each of the light path samples for the given pixel, an intensity weight for a light path scaled by an expected response from a point at a distance for the light path, offset by a measure of ambient light.

20. The one or more computer-readable media of claim 15, wherein the operations further comprise:
- calibrating exposure profiles to reduce multipath light effects.

\* \* \* \* \*